(12) United States Patent
Ueda et al.

(10) Patent No.: US 9,552,351 B2
(45) Date of Patent: Jan. 24, 2017

(54) INFORMATION PROCESSING SYSTEM AND INFORMATION PROCESSING METHOD FOR CHARACTER INPUT PREDICTION

(71) Applicant: OMRON Corporation, Kyoto (JP)

(72) Inventors: Masaharu Ueda, Shiga (JP); Chihoka Moribe, Osaka (JP); Mayu Nakano, Kyoto (JP); Takuya Nakayama, Kyoto (JP)

(73) Assignee: OMRON Corporation, Kyoto (JP)

( * ) Notice: Subject to any disclaimer, the term of this patent is extended or adjusted under 35 U.S.C. 154(b) by 27 days.

(21) Appl. No.: 14/617,678

(22) Filed: Feb. 9, 2015

(65) Prior Publication Data

US 2015/0261741 A1 Sep. 17, 2015

(30) Foreign Application Priority Data

Mar. 14, 2014 (JP) ................................ 2014-051485
Dec. 25, 2014 (JP) ................................ 2014-262951

(51) Int. Cl.
*G06F 17/21* (2006.01)
*G06F 17/27* (2006.01)
(Continued)

(52) U.S. Cl.
CPC ............. *G06F 17/276* (2013.01); *G06F 3/018* (2013.01); *G06F 3/0237* (2013.01);
(Continued)

(58) Field of Classification Search
CPC ....... G06F 17/00; G06F 17/273; G06F 17/276
(Continued)

(56) References Cited

U.S. PATENT DOCUMENTS 7,685,144 B1 * 3/2010 Katragadda ........... G06F 3/0237
707/999.101
8,645,825 B1 2/2014 Cornea et al.
(Continued)

FOREIGN PATENT DOCUMENTS

EP 2120156 A2 11/2009
JP H10-222496 A 8/1998
(Continued)

OTHER PUBLICATIONS

Extended European Search Report issued in corresponding European Application No. 15154902.9 dated Aug. 3, 2015 (29 pages).

*Primary Examiner* — Shaun Roberts
(74) *Attorney, Agent, or Firm* — Osha Liang LLP

(57) ABSTRACT

An information processing system for input prediction that displays written character string candidates of words or phrases corresponding to an input character string in a terminal device. The terminal device acquires internal candidates by performing a search based on the input character string and transmits a candidate transmission request signal including identification information of a terminal dictionary stored in the terminal device and the input character string to a server. The server performs a search through the terminal dictionary corresponding to the identification information in the received signal and through a server dictionary dedicated to the server. From dictionary data extracted from the server dictionary, the server returns dictionary data of external candidates different from dictionary data extracted from the terminal dictionary as external candidates to the terminal device. The terminal device generates a final candidate list by arranging the internal and external candidates according to a predetermined priority.

11 Claims, 15 Drawing Sheets

(51) Int. Cl.
  *G06F 17/22* (2006.01)
  *G06F 3/01* (2006.01)
  *G06F 3/023* (2006.01)
  *G06F 17/30* (2006.01)

(52) U.S. Cl.
  CPC ...... *G06F 17/2223* (2013.01); *G06F 17/2735* (2013.01); *G06F 17/30684* (2013.01)

(58) Field of Classification Search
  USPC ........................................ 704/9, 10; 715/257
  See application file for complete search history.

(56) References Cited

U.S. PATENT DOCUMENTS

| | | | | |
|---|---|---|---|---|
| 9,047,012 | B1* | 6/2015 | Bringert | G06F 3/04886 |
| 2006/0075120 | A1* | 4/2006 | Smit | G06F 17/2288 |
| | | | | 709/227 |
| 2006/0242109 | A1* | 10/2006 | Pereira | G06F 17/276 |
| 2010/0064322 | A1 | 3/2010 | Uno | |

FOREIGN PATENT DOCUMENTS

| | | |
|---|---|---|
| JP | 2009-135716 A | 6/2009 |
| JP | 2012/198863 A | 10/2012 |

\* cited by examiner

Fig. 10

| EXPRESSION | PRIORITY | ATTRIBUTE DATA |
|---|---|---|
| おはよう | 2 0 | 朝 |
| おつかれさま | 2 0 | 夕, 夜 |
| おはようございます | 1 8 | 朝 |
| おかえり | 1 6 | 夕, 夜 |
| おげんき | 1 5 | |
| おつかれさまです | 1 5 | 夕, 夜 |
| おそく | 1 4 | |
| おはよー | 1 1 | 朝 |
| おつかれ | 8 | 夕, 夜 |

20

| EXPRESSION | PRIORITY | ATTRIBUTE DATA |
|---|---|---|
| Hello. | 30 | |
| Hi. | 28 | |
| How are you ? | 22 | Morning, Afternoon |
| Happy Birthday. | 20 | |
| Have a nice dream. | 19 | Night |
| How about you ? | 18 | |
| Have a good sleep. | 17 | Night |
| Have a nice day. | 16 | Morning, Afternoon |
| How's it going ? | 10 | Morning, Afternoon |
| Have you | 8 | |

INFORMATION PROCESSING SYSTEM AND INFORMATION PROCESSING METHOD FOR CHARACTER INPUT PREDICTION

BACKGROUND OF THE INVENTION

One or more embodiment of the present invention relate to an information processing system comprising: a terminal device having functions of displaying, in response to a character input operation, a candidate list for a written character string of a word or a phrase that a user intends to input by the operation (hereinafter this processing is referred to as "input prediction processing") and determining, in response to an operation of selecting one of candidates in the displayed list, the selected candidate as an input character string; and a server that transmits, to the terminal device, candidates of words or phrases that can be included in the candidate list in response to a candidate transmission request from the terminal device. One or more embodiments of the present invention also relate to an information processing method performed for character input processing in the terminal device of this system.

As an example of such an information processing method, Patent Literature 1 describes that in a system connecting a server that performs kana-kanji conversion processing and a client terminal device via a network, the client having received data input issues a conversion request to the server, the server performs conversion processing such as kanji conversion with automatic clause-parsing and returns data representing the conversion results thereof to the client, and the client displays the conversion results based on the transmitted data from the server in order to accept a selecting operation by a user.

In recent years, also in character input processing in a mobile terminal device such as a mobile phone, a conversion request similar to that described in Patent Literature 1 may be issued to a web server by means of communication and candidates extracted by a server-side search (hereinafter referred to as "external candidates") may be displayed in the terminal device.

Patent Literature 2 is another example of a method for improving a conversion function of a terminal device by acquiring an additional dictionary from a web server and registering this dictionary in the terminal device has been proposed.

Patent Literature 1: Japanese Patent Application Laid-open No. Hei. 10-222496

Patent Literature 2: Japanese Patent Application Laid-open No. 2009-135716

SUMMARY

The method that acquires the external word or phrase candidates from the server is advantageous in that the function of displaying candidates can be improved without increasing the volume of the dictionary in the device. However, a large number of candidates may be transmitted from the server and the terminal device needs to eliminate candidates that already exist in its own dictionary (hereinafter referred to as "internal candidates"). Thus, the method may take a long time to display the candidate list.

Moreover, the conventional methods have no means for adjusting a display order in a flexible manner without distinction between the external candidates and the internal candidates. Therefore, convenience in the operation of selecting a candidate is poor as an external candidate having a high priority may be placed at the bottom in the candidate list. Thus, selecting a candidate is a time-consuming operation.

One or more embodiments of the present invention enables the external candidates to be imported in a short period of time and enables the number of words in the candidate list to be increased and a candidate to be easily selected by displaying candidates according to the priorities thereof without distinction between external candidates and internal candidates.

One or more embodiments of the present invention is directed to a system comprising: a terminal device that is configured to display a candidate list of a word or a phrase corresponding to an input character string set according to a character input operation and determine, according to an operation of selecting one candidate from a displayed candidate list, a selected candidate as a character string to be inputted; and a server that transmits a candidate capable of being included in the candidate list to the terminal device in response to a request from the terminal device. Terminal dictionaries, each registering a plurality of dictionary data pieces and each dictionary data pieces having a configuration associating a written character string representing a word or phrase with a priority, and a server dictionary that registers more pieces of dictionary data than each of the plurality of terminal dictionaries does in the server. On the other hand, one of the plurality of terminal dictionaries is stored in the terminal device.

The terminal device comprises: a dictionary storage unit that stores the terminal dictionary; internal candidate acquisition unit that acquires dictionary data including a candidate selected by searching an input character string through the terminal dictionary in the dictionary storage unit; external candidate acquisition unit that transmits a candidate transmission request signal comprising identification information of the terminal dictionary in the dictionary storage unit and the input character string to the server and acquires dictionary data including a candidate returned from the server in response to the transmission of the candidate transmission request signal; and list generating unit that generates a candidate list by arranging written character strings of the dictionary data acquired by the internal candidate acquisition unit and the external candidate acquisition unit according to priorities of the list generating unit.

The server comprises: a dictionary storage unit that stores a plurality of the terminal dictionaries and a server dictionary; a candidate transmission request reception unit that accepts the candidate transmission request signal from the terminal device; a search unit that performs a search based on the input character string included in the candidate transmission request signal through the terminal dictionary corresponding to the identification information in the candidate transmission request signal and through the server dictionary; and a candidate returning unit that returns dictionary data extracted by the search through the server dictionary and different from dictionary data extracted by the search through the terminal dictionary to the terminal device having transmitted the candidate transmission request signal.

According to one or more embodiments of the present invention, once an input character string is set in the terminal device by a character input operation performed by a user using the terminal device, the terminal device can perform a search through the terminal dictionary in the dictionary storage unit of the device and output a candidate transmission request signal to the external server. In response to this candidate transmission request signal, the server performs a search through the terminal dictionary same as that in the terminal device having transmitted the signal and a search through the server dictionary registering more dictionary data and returns dictionary data corresponding to a portion of the latter search result different from the former search result to the terminal device. Advantageously, the present invention makes it possible to substantially reduce the volume of transmission from the server.

The terminal device having received the return of dictionary data as described above generates the candidate list comprising the external candidates obtained by the dictionary data transmitted from the server in addition to the internal candidates obtained by the search in the terminal device. According to this candidate list, no distinction is made between the internal candidates and the external candidates and these candidates are displayed with an arrangement order according to a predetermined priority. Thus, convenience in candidate selection is enhanced.

According to one or more embodiments of the present invention, the server comprises a transmitted data storage unit that temporarily retains the dictionary data returned to the terminal device in response to the candidate transmission request signal from the terminal device. The candidate returning unit of the server returns a predetermined number of dictionary data pieces not retained in the transmitted data storage unit, selected in descending order of priority from among the dictionary data extracted by the search performed by searching through the server dictionary and different from the dictionary data extracted by the search through the terminal dictionary, to the terminal device having transmitted the candidate transmission request signal.

Furthermore, the terminal device according to one or more embodiments of the present invention may include a received data storage unit that temporarily retains the dictionary data returned from the server in response to the candidate transmission request signal. The internal candidate acquisition unit of the terminal device performs a search based on the input character string on the dictionary data retained in the received data storage unit as well as on the terminal dictionary in the device's own dictionary storage unit.

According to one or more embodiments of the present invention, even when a large number of candidates capable of being returned as external candidates are extracted in response to the candidate transmission request from the terminal device, only dictionary data for a certain number of candidates having high-ranked priorities are transmitted to the terminal device. Thus, the volume of transmission from the server can be kept low. Moreover, the dictionary data transmitted to the terminal device are temporarily retained in both of the terminal device and the server. If the input character string is updated, while the server transmits only dictionary data not retained in the transmitted data storage unit, the terminal device also performs a search through the received data storage unit in addition to the terminal dictionary. Thus, the display of candidates corresponding to the input character string can be performed.

According to one or more embodiments of the present invention, the candidate returning unit of the server adds, from among the dictionary data extracted from the server dictionary by the search performed by searching in response to the candidate transmission request signal, dictionary data having the same written character string as the dictionary data extracted by the search through the terminal dictionary but having a different priority to a return subject to the terminal device. When both of the external candidate acquisition unit and the internal candidate acquisition unit have acquired dictionary data about the same written character string, the list generating unit of the terminal device adopts the dictionary data acquired by the external candidate acquisition unit to generate the candidate list.

According to one or more embodiments of the present invention, as long as the priorities in the server dictionary are revised as needed, a display order of candidates can be determined on the basis of the latest dictionary data returned from the server even if the terminal dictionary goes out of date and therefore dictionary data having a priority unrealistic for candidate selection is included.

According to one or more embodiments of the present invention, dictionary data of a word or a phrase whose proper input time can be specified in the server dictionary of the server may include attribute data representing the time. Moreover, the external candidate acquisition unit of the terminal device transmits, to the server, the candidate transmission request signal with information representing time when input of the input character string in the signal is accepted is included in the external candidate acquisition unit. The candidate returning unit of the server adds a predetermined positive adjustment value to a priority of dictionary data comprising attribute data matched with the information representing the time in the candidate transmission request signal among the dictionary data extracted from the server dictionary in response to the candidate transmission request signal and adds dictionary data having a higher priority than the dictionary data extracted by the search through the terminal dictionary for the input character string in the candidate transmission request signal to a return subject to the terminal device. Furthermore, when both of the external candidate acquisition unit and the internal candidate acquisition unit have acquired dictionary data about the same written character string, the list generating unit of the terminal device adopts the higher-priority dictionary data to generate the candidate list.

According to one or more embodiments of the present invention, when a character string corresponding to a word or a phrase whose frequency of use is increased during a particular period of time is inputted to the terminal device, based on the information representing the time when the input of the input character string in the candidate transmission request signal transmitted from the terminal device to the server is accepted, the priority of dictionary data having attribute data matched with the time indicated by such information among the dictionary data extracted by the search through the server dictionary is adjusted to a value higher than usual. When the dictionary data on which the adjustment is performed is extracted also from the terminal dictionary, the dictionary data extracted from the server dictionary and having the adjusted priority is transmitted to the terminal device and used for generating the candidate list in the terminal device. Thus, the written character string of this dictionary data is displayed at a rank higher than usual. Therefore, when a word or phrase whose frequency of use is increased during a particular period of time is inputted during the particular period of time, a desired word or phrase becomes more likely to be displayed at a high rank, thereby further enhancing convenience in candidate selection.

According to one or more embodiments of the present invention, the dictionary data in the terminal dictionary and the server dictionary each include a pre-conversion character string (for example, a Japanese kana character string) representing reading of a written character string according to a predetermined character type (for example, a Japanese kanji character string). In response to reception of an operation of inputting a character having the same character type as the pre-conversion character string, the terminal device sets an input character string according to the character type and performs the processing of the internal candidate acquisition unit and the external candidate acquisition unit.

According to one or more embodiments of the present invention, the terminal device may include an index information storage unit that registers a pre-conversion character string in dictionary data registered not in the device's own terminal dictionary but in the server dictionary. The external candidate acquisition unit may perform a search based on the input character string set by the operation of inputting a character representing reading of a written character string through the index information storage unit, and may transmit the candidate transmission request signal only when the pre-conversion character string corresponding to the input character string is found. In this manner, only if a word or phrase not registered in the device's own dictionary is registered in the server dictionary as a word or phrase corresponding to the inputted reading character string, the terminal device transmits the candidate transmission request signal to the server in order to acquire the dictionary data of the corresponding word or phrase. Consequently, wasteful communication with the server can be prevented from occurring when no external candidate can be obtained. Thus, displaying the candidate list can be done promptly.

According to one or more embodiments of the present invention, when introduced into a computer storing the various kinds of terminal dictionaries and the server dictionary, a first program can cause the computer to operate as a server, the server comprises a candidate transmission request reception unit, a search unit, and a candidate returning unit. According to one or more embodiments of the present invention, when introduced into a computer of a terminal device storing one of a plurality of terminal dictionaries, a second program can cause the computer to operate as a character input device, the character input device comprises an internal candidate acquisition unit, an external candidate acquisition unit, and a list generating unit.

According to one or more embodiments of the present invention, since only candidates for dictionary data different from dictionary data of candidates the terminal device can acquire by itself are transmitted from the server, an amount of time necessary to transmit the dictionary data can be substantially reduced. Moreover, since a candidate list in which the written character strings of candidates are arranged according to the priorities thereof without distinction between internal candidates and external candidates can be displayed, candidate selection is facilitated, thereby enhancing its convenience.

BRIEF DESCRIPTION OF THE DRAWINGS

FIG. 10 is an explanatory diagram illustrating an example of dictionary data for a Japanese server dictionary comprising attribute data representing time when an input frequency is increased according to one or more embodiments of the present invention.

DETAILED DESCRIPTION

Figure 1:
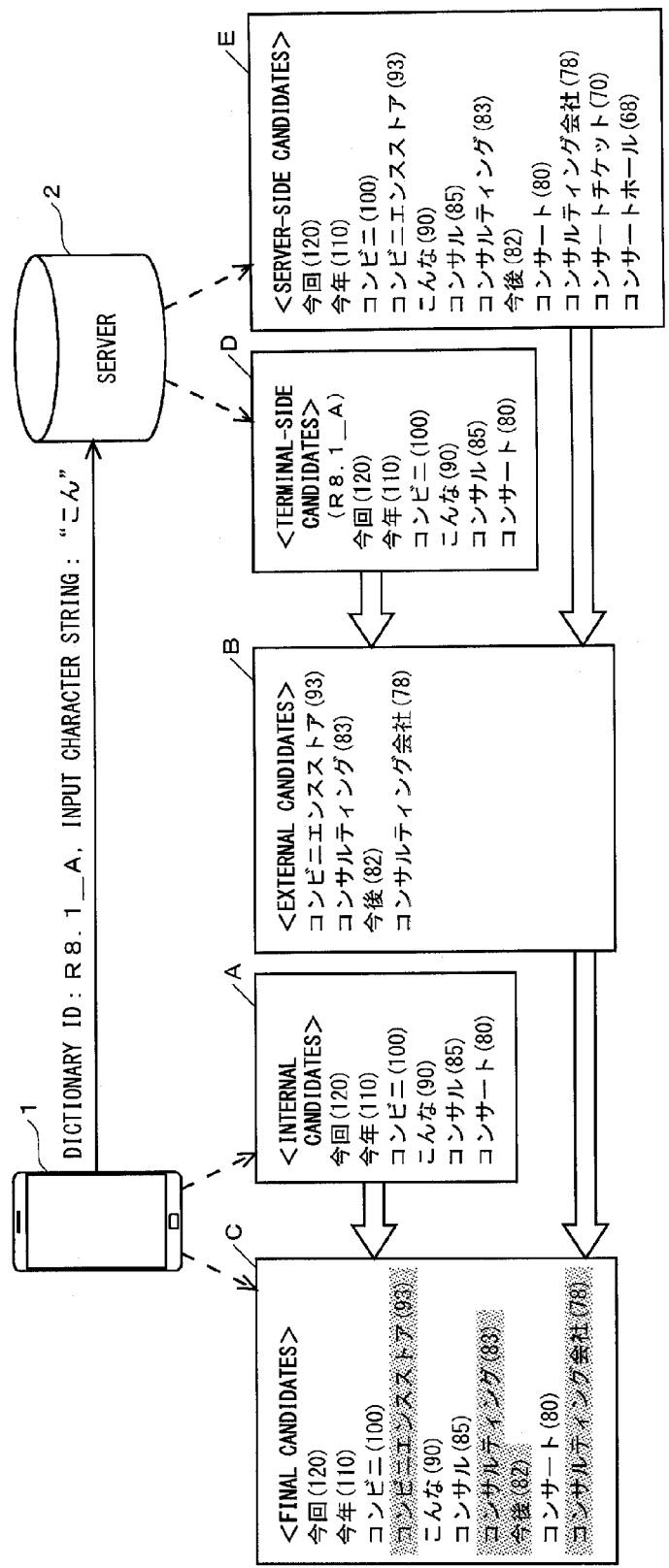
FIG. 1 is an explanatory diagram illustrating the outline of Japanese input prediction processing in an information processing system to which one or more embodiments of the present invention is applied.
Figure 2:
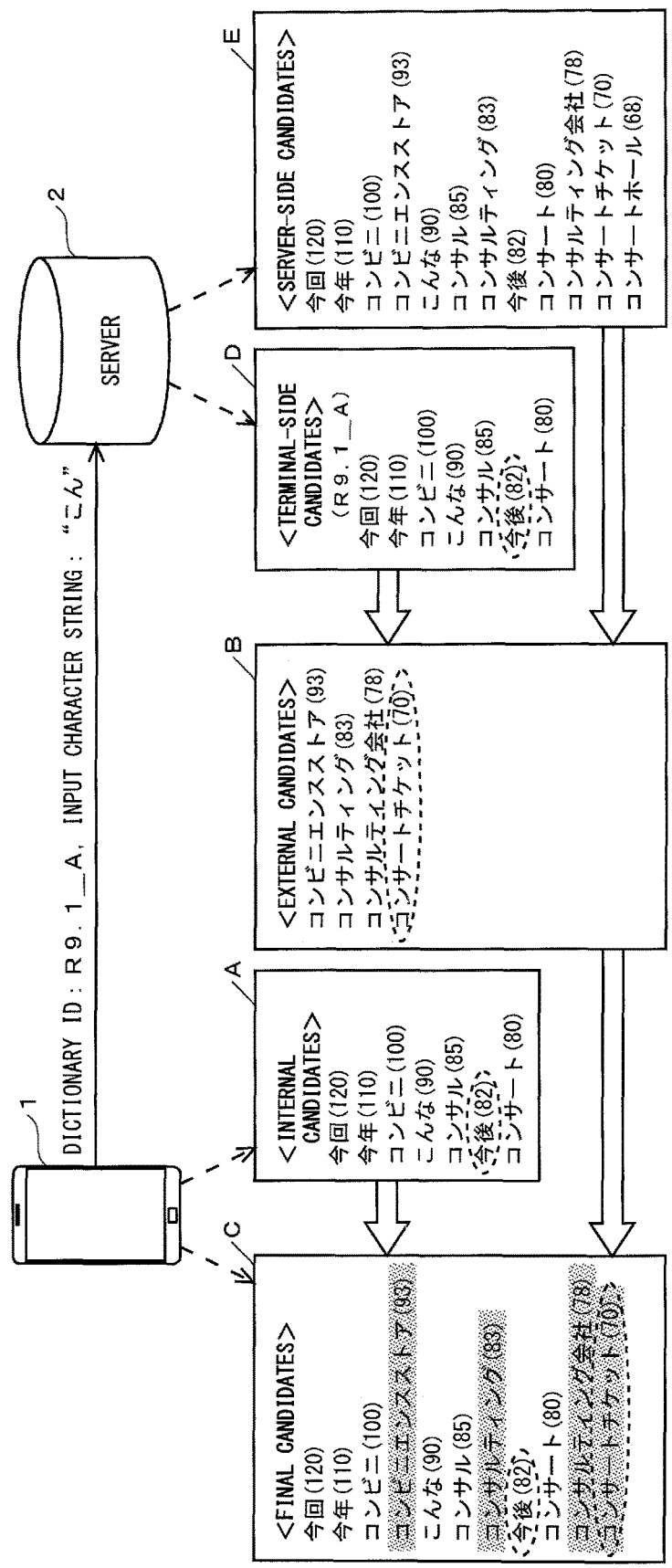
FIG. 2 is an explanatory diagram illustrating the outline of Japanese input prediction processing in the information processing system to which one or more embodiments of the present invention is applied.
Figure 3:
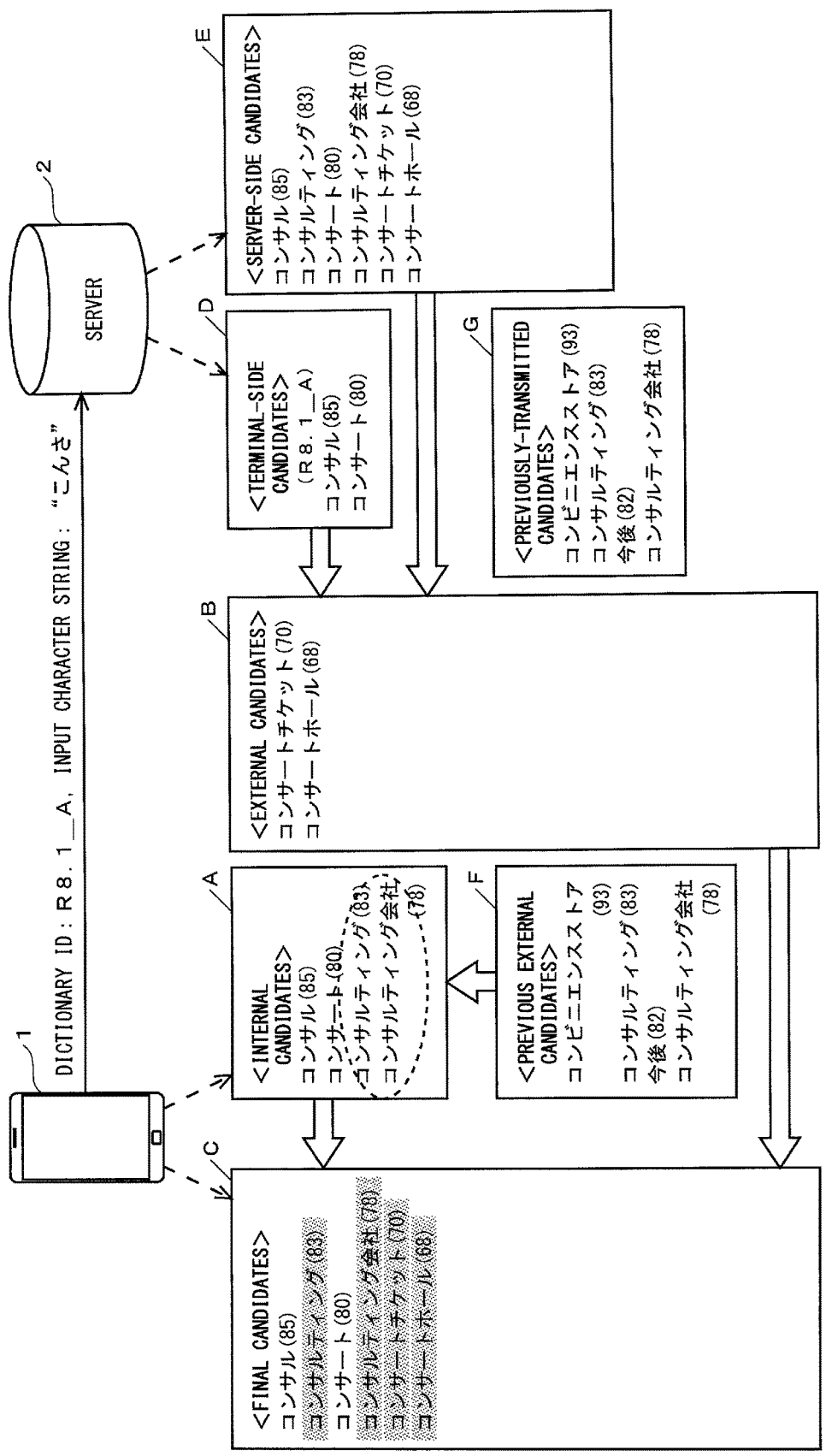
FIG. 3 is an explanatory diagram illustrating the outline of Japanese input prediction processing in the information processing system to which one or more embodiments of the present invention is applied.

FIGS. 1 to 3 each illustrate a case where an information processing system according to one or more embodiments of the present invention is applied to input prediction processing in a mobile terminal device 1. While a smartphone is illustrated as an example of the terminal device 1 in each of these figures, the terminal device 1 is not limited thereto. The smartphone can be replaced by various forms of a terminal device including, but not limited to, a tablet terminal, a PDA, and a mobile phone having a push-button operating unit.

According to one or more embodiments of the present invention, the information processing system, in response to an operation of inputting a kana character string representing the reading of a word or phrase (a word or an expression) to be inputted in the terminal device 1 having a Japanese character type converting function, the terminal device 1 predicts the word or phrase a user intends to input while communicating with a server 2. The terminal device 1 generates a candidate list based on the prediction result.

According to one or more embodiments of the present invention, the terminal device 1 has a conversion dictionary installed therein, the conversion dictionary varying depending on its model, date of manufacture, or the like. Hereinafter, such a terminal-side dictionary is denoted by the reference numeral shown in FIG. 7 and referred to as a "terminal dictionary 10."

All types of terminal dictionaries 10 are registered in the server 2. Furthermore, a dedicated conversion dictionary having dictionary data much larger than those in the individual terminal dictionaries 10 is registered in the server 2. Hereinafter, such a conversion dictionary dedicated to the server 2 is denoted by the reference numeral shown in FIG. 7 and referred to as a "server dictionary 20." A plurality of dictionary data pieces each having a configuration associating a written character string (a post-conversion character string) representing a word or phrase with a reading character string (a pre-conversion character string) representing reading (pronunciation) and a priority are registered in each of the terminal dictionaries 10 and the server dictionary 20.

In FIG. 1, the terminal device 1 has the terminal dictionary 10 with identification information (hereinafter referred to as a "dictionary ID") "R8.1_A." In FIG. 2, the terminal device 1 has the terminal dictionary 10 with a dictionary ID "R9.1_A." In a case where a kana character string "こん (kon)" is inputted to the terminal device 1 as an example, FIGS. 1 and 2 illustrate a principle of processing for acquiring a candidate list corresponding to this input character string. While any of candidate lists in an embodiment shown in FIGS. 1 to 3 is a list of only word candidates (including a combination of a plurality of words), a list including character strings representing phrases or sentences may be generated as in later-described examples shown in FIGS. 11 and 12.

The terminal device 1 according to one or more embodiments of the present invention also extracts a predetermined number of candidates (internal candidates) to generate a list A in the figures by performing a search based on an input character string through the device's own terminal dictionary 10 and extracting a word having a reading character string anteriorly matched with the input character string as a candidate. Furthermore, the terminal device 1 receives the provision of candidates (external candidates) not registered in the device's own terminal dictionary 10 from the server 2. The terminal device 1 merges a list B of the provided external candidates and the list A of internal candidates together so as to generate a list C of final candidates to be displayed on a screen of the terminal device 1. In the list C in FIGS. 1 to 3, candidates originating from the external candidates are indicated with a shaded pattern applied thereto.

In order to acquire the external candidates, the terminal device 1 transmits a candidate transmission request signal including the dictionary ID of the device's own terminal dictionary 10 and the current input character string to the server 2. The server 2 having accepted the candidate transmission request signal performs a search based on the input character string extracted from the received signal together with the dictionary ID through each of the terminal dictionary 10 corresponding to the dictionary ID in the signal and the server dictionary 20 so as to extract words, each having a reading character string anteriorly matched with the input character string, as candidates. As a result, a list D having the same contents as the list A in the terminal device 1 is generated from the terminal dictionary 10. A list E containing much more candidates is generated from the server dictionary 20. In FIGS. 1 to 3, the candidates in the list D are referred to as "terminal-side candidates" and the candidates in the list E are referred to as "server-side candidates."

The server 2 cross-checks the above-described two kinds of lists D and E, deletes a candidate included in the list D from the list E, and selects up to n candidates (n=4 in the illustrated example) in descending order of priority from among the remaining candidates. In this manner, the external candidate list B is generated. The higher the numerical value representing a priority, the higher the priority is.

In the search through each of the dictionaries 10 and 20, dictionary data that comprises a written character string, a reading character string, and a priority is extracted. While each of the lists A to E has dictionary data arranged in descending order of priority, each candidate is shown in FIGS. 1 to 3 without the reading character string thereof and with an addition of a number (for example, 120) indicating the priority thereof put in parentheses after a written character string (for example, "今回 (konkai)").

Based on the thus configured dictionary data, the terminal device 1 generates the list C in which all candidates are arranged in descending order of priority without distinction between the candidates in the list A generated in the terminal device itself and the candidates in the list B acquired from the server 2. Only the written character strings in the list C are displayed.

As described above, the server 2 transmits, to the terminal device 1, candidates the terminal device 1 cannot acquire by itself after narrowing them down in descending order of priority. Thus, a volume of transmission data can be reduced. Moreover, the list D having the same contents as the terminal-side internal candidate list A is generated by using the terminal dictionary 10 same as that used in the terminal device 1 having requested the transmission of candidates and the candidates included in the list D are excluded from transmission subjects. Thus, as can be seen from the comparison between FIGS. 1 and 2, even when the candidate transmission request signal including the same reading character string is received, the contents of the external candidate list B generated by the server 2 may be varied if the dictionary ID included in the signal is different. If there is a difference in the contents of the list B, a difference is generated also in the final candidate list C displayed in the terminal device 1.

More specifically, in response to the input character string "こん (kon)," the terminal device 1 of FIG. 1 having the terminal dictionary 10 of "R8.1_A" extracts six internal candidates "今回 (konkai)," "今年 (kotoshi)," "コンビニ (konbini)," "こんな (konna)," "コンサル (konsaru)," and "コンサート (konsaato)" with the beginning of its reading character string being "こん (kon)." The terminal device 1 also receives, from the server 2, the provision of four external candidates "コンビニ エンスストア (konbiniensusutoa)," "コンサルティング (konsarutingu)," "今後 (kongo)," and "コンサルティング 会社 (konsarutingu kaisha)" with the beginning of its reading character string being "こん (kon)." The terminal device 1 then generates the final candidate list C with a total of these ten candidates combined together.

In FIG. 2, different portions from the example shown in FIG. 1 are surrounded by dotted lines in the lists A to D. The terminal dictionary 10 of "R9.1_A" possessed by the terminal device 1 of this example includes "今後 (kongo)," which is not included in the terminal dictionary 10 of FIG. 1. Thus, the internal candidate list A or the terminal-side candidate list D generated in the server 2 for the input character string "こん (kon)" includes "今後 (kongo)" in addition to the six words extracted in the example of FIG. 1 (see dotted line portions in the lists A and D in FIG. 2). Thus, the external candidate list B from the server 2 does not include "今後 (kongo)" but includes "コンサートチケット (konsaatochiketto)" excluded from transmission subjects in the example of FIG. 1 instead. As a result, the final candidate list C also includes "コンサートチケット (konsaatochiketto)," which is not included in the example of FIG. 1 (see dotted line portions in the lists B and C in FIG. 2).

The above-described processing is performed every time an input character string is updated by a character input operation performed by a user. Also at a point one step before the examples of FIGS. 1 and 2, i.e., at a point when "こ (ko)" at the beginning of the reading character string "こん (kon)" is inputted, the terminal device 1 similarly generates the internal candidate list A, transmits the candidate transmission request signal to the server 2 so as to acquire the external candidate list B, and merges the lists A and B together so as to generate the final candidate list C.

Although omitted in FIGS. 1 and 2 for ease of explanation, the terminal device 1 of one or more embodiments of the present invention merges the two lists A and B to generate the final candidate list C and stores the list B as a previous list in preparation for importing next external candidates. Every time the server 2 transmits the external candidate list B to the terminal device 1, the server 2 also stores the transmitted list B as a previous list.

FIG. 3 shows the outline of processing including the use of the above-described previous lists taking, as an example, a case where an input character is added so that the input character string is updated from "こん (kon)" illustrated in FIG. 1 to "こんさ (konsa)" in the terminal device 1 employing the terminal dictionary with the dictionary ID "R8.1_A" same as that in FIG. 1.

The terminal device 1 generates the internal candidate list A corresponding to the updated input character string "こんさ (konsa)." The terminal device 1 also transmits a candidate transmission request signal including the dictionary ID and the current input character string "こんさ (konsa)" to the server 2 in order to acquire external candidates. In response to this request, the server 2 performs a search through the terminal dictionary 10 with the dictionary ID "R8.1_A" and the server dictionary 20 so as to generate the terminal-side candidate list D and the server-side candidate list E, respectively, corresponding to the input character string "こんさ (konsa)."

Moreover, a list F of the external candidates provided by the server 2 for the input character string "こん (kon)" input in one step before the present step (list transferred from the list B in FIG. 1) is stored in the terminal device 1 and a list G having the same contents as the list F is stored in the server 2. The server 2 refers to the list G in addition to the lists D and E of candidates for the current input character string "こんさ (konsa)" so as to extract, from the list E, up to n (n=4 in the illustrated example) server-side candidates not included in the lists D and G in descending order of priority.

The server 2 generates a new list B containing these candidates and transmits the list B to the terminal device 1.

The terminal device 1, on the other hand, generates the internal candidate list A by the processing of extracting a word having a reading character string anteriorly matched with the input character string "こんさ (konsa)" as a candidate from the device's own terminal dictionary 10. Thereafter, the terminal device 1 similarly performs a search for extracting a word having a reading character string anteriorly matched with "こんさ (konsa)" as a candidate on the previous external candidate list F. The terminal device 1 adds the thus extracted "コンサルティング (konsarutingu)" and "コンサルティング会社 (konsarutingu kaisha)" to the list A (see a dotted line portion in the list A in FIG. 3). Thereafter, the list B provided by the server 2 is merged into the list A after such an addition so as to generate the final candidate list C including "コンサルティング (konsarutingu)" and "コンサルティング会社 (konsarutingu kaisha)" in the previous external candidate list F and "コンサートチケット (konsaatochiketto)" and "コンサートホール (konsaatohooru)" in the current external candidate list B.

According to one or more embodiments of the present invention, if a character input operation for inputting a single word is performed in a divided manner over a plurality of times in the terminal device 1, the terminal device 1 communicates with the server 2 every time an input character string is updated by an operation. At each time, unsent candidates are transmitted from the server 2 after they are narrowed down to a certain number according to the priorities thereof and the previously-transmitted candidates are extracted from the list F in the terminal device 1. Thus, wasteful communication can be prevented from occurring and each communication can be done in a short period of time.

The input prediction processing shown in FIGS. 1 to 3 can also be applied to an input of a character string in another language without being limited to an input of a Japanese character string. As an example, FIGS. 4 to 6 each illustrate a case where the terminal device 1 having an English terminal dictionary 10 acquires words or phrases not registered in the device's own dictionary 10 as external candidates by means of communication with the server 2. Also in these examples, candidates originating from external candidates in the list C are indicated by a shaded pattern applied thereto. Moreover, as with the examples shown in FIGS. 1 to 3, each list contains only word candidates.

Figure 4:
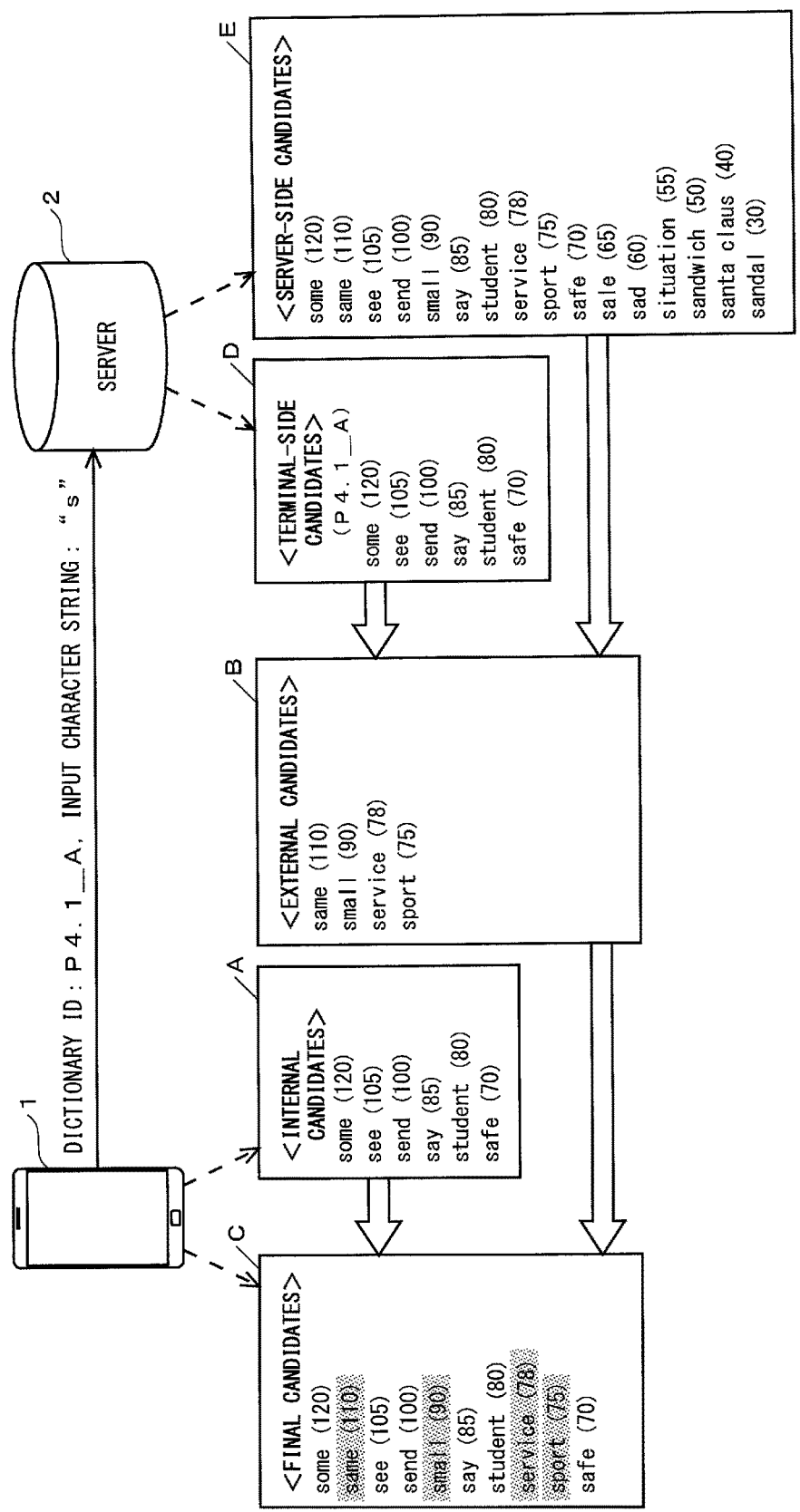
FIG. 4 is an explanatory diagram illustrating the outline of English input prediction processing in an information processing system to which one or more embodiments of the present invention is applied.
Figure 5:
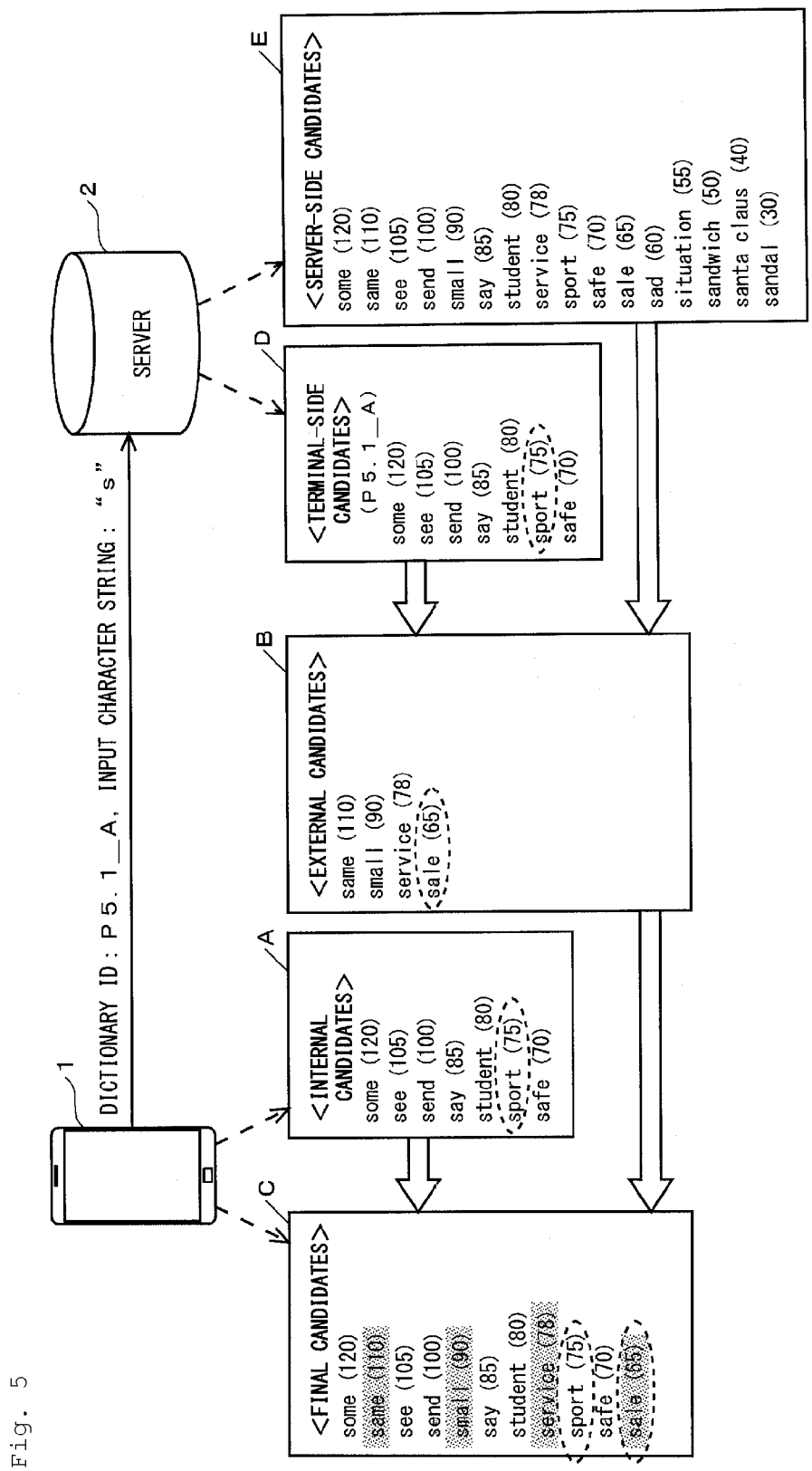
FIG. 5 is an explanatory diagram illustrating the outline of English input prediction processing in the information processing system to which one or more embodiments of the present invention is applied.

Taking a case where a character "s" is inputted to the terminal device 1 as an example, FIGS. 4 and 5 each illustrate a principle of processing for acquiring a candidate list corresponding to the input character string composed of this one character. The terminal device 1 in the example of FIG. 4 has the terminal dictionary 10 with a dictionary ID "P4.1_A." The terminal device 1 in the example of FIG. 5 has the terminal dictionary 10 with a dictionary ID "P5.1_A." The server 2 is provided with a plurality of terminal dictionaries 10 comprising the above-described two kinds of terminal dictionaries 10 and a server dictionary 20 having registered words larger than those of the individual terminal dictionaries 10. Dictionary data of the English terminal dictionaries 10 and server dictionary 20 include no data corresponding to a Japanese reading character string. When searching through each of the dictionaries 10 and 20, dictionary data, each having a written character string anteriorly matched with the input character string, are extracted.

The terminal device 1 in the example of FIG. 4 performs a search based on the input character "s" through the device's own terminal dictionary 10 and extracts six words "some," "see," "send," "say," "student," and "safe." The terminal device 1 generates a list A containing these words as internal candidates. Moreover, the terminal device 1 transmits a candidate transmission request signal including the input character "s" and the dictionary ID "P4.1_A" of the device's own terminal dictionary 10 to the server 2. In response to this candidate transmission request signal, the server 2 performs a search based on the input character "s" in the candidate transmission request signal through each of the terminal dictionary 10 of "P4.1_A" and the server dictionary 20 within the server 2. As a result, the server 2 generates the terminal-side candidate list D having the same contents as the list A and the server-side candidate list E containing much more candidates than those in the list D. Furthermore, the server 2 selects, from the list E, up to n candidates (n=4 in the illustrated example) not included in the list D in descending order of priority. As a result, the server 2 generates the list B containing four words "same," "small," "service," and "sport" as external candidates and transmits the list B to the terminal device 1.

The terminal device 1 having received the transmission of the list B arranges a total of ten candidates obtained by combining the four external candidates in the list B and the six internal candidates in the list A together in descending order of priority so as to generate the final candidate list C.

The terminal dictionary 10 of "P5.1_A" possessed by the terminal device 1 in the example of FIG. 5 includes "sport" not included in the terminal dictionary 10 in the example of FIG. 4. Thus, the internal candidate list A or the terminal-side candidate list D for the input character string "s" contains a total of seven words composed of "sport" and the six words same as those in the example of FIG. 4. Thus, while "sport" is not included in the external candidate list B from the server 2, "sale," which is excluded from transmission subjects in the example of FIG. 4 is included in the list B instead. Therefore, the number of candidates in the final candidate list C generated in the terminal device 1 having received the transmission of the list B is greater than the number of candidates in the list C of FIG. 4 by one.

Also in the English input prediction processing, every time the terminal device 1 generates the final candidate list C by adding the external candidate list B provided from the server 2 to the internal candidate list A, the terminal device 1 stores the list B as the previous external candidate list F. The server 2 also stores the list B having been transmitted to the terminal device 1 as the previously-transmitted candidate list G.

Figure 6:
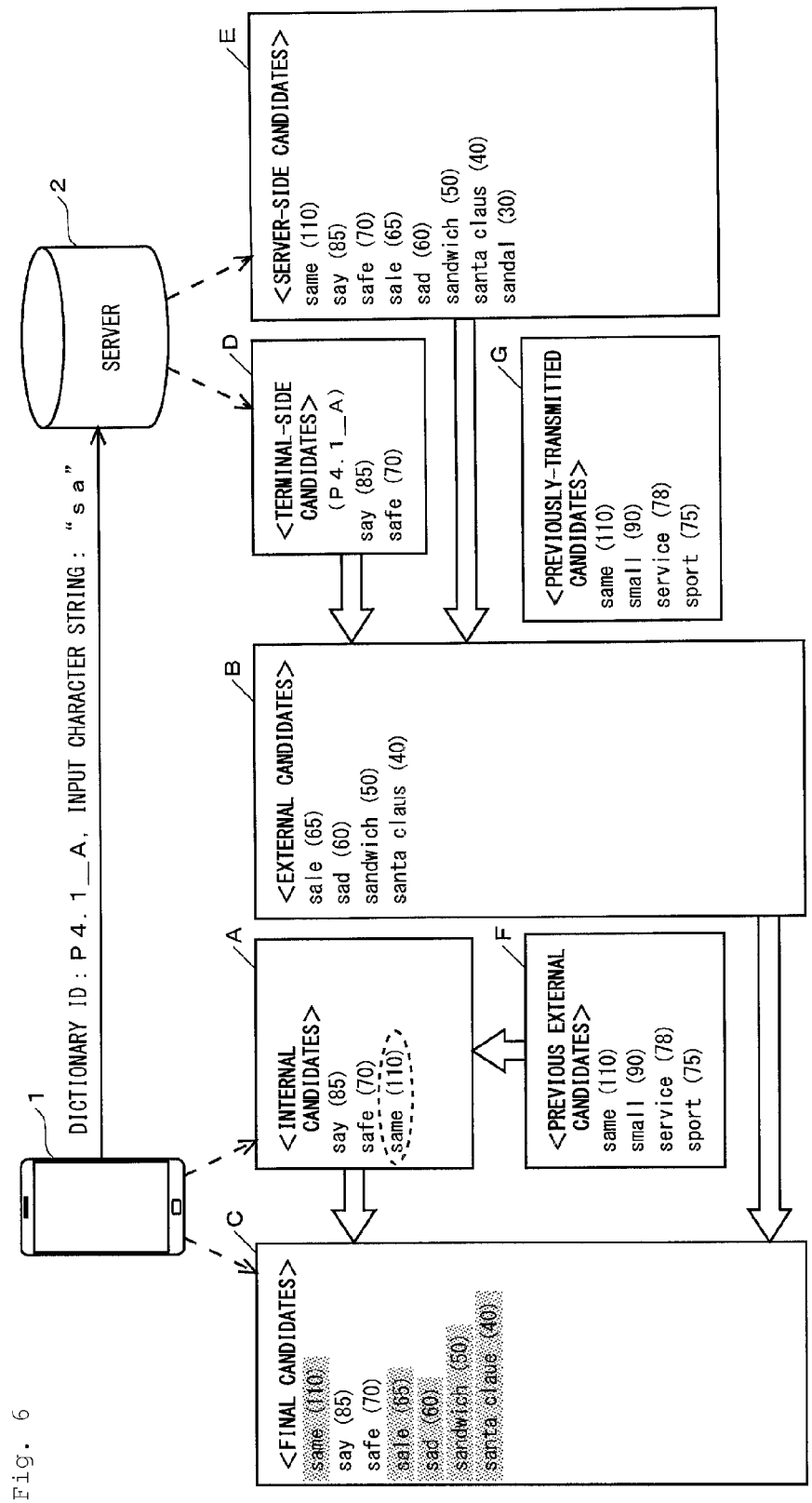
FIG. 6 is an explanatory diagram illustrating the outline of English input prediction processing in the information processing system to which one or more embodiments of the present invention is applied.

FIG. 6 shows the contents of various lists including the lists F and G taking, for example, a case in which an input character "a" is added to the aforementioned input character "s" so that the input character string is updated to "sa" in the terminal device 1 that employs the terminal dictionary 10 with the dictionary ID "P4.1_A" same as that in FIG. 4. In FIG. 6, the lists F and G correspond to the external candidate list B (shown in FIG. 4) provided to the terminal device 1 from the server 2 for the input character string "s" one step before.

The terminal device 1 in the example of FIG. 6 performs a search based on the updated input character string "sa" through the device's own terminal dictionary 10 and acquires two words "say" and "safe." The terminal device 1 also acquires "same," including "sa," at the beginning thereof from the list F. The terminal device 1 generates the list A containing these three words as internal candidates. The server 2 performs a search based on the input character string "sa" included in the candidate transmission request signal from the terminal device 1 so as to update the terminal-side candidate list D and the server-side candidate list E. Thereafter, the server 2 extracts, from the list E, up to n (n=4 in the illustrated example) server-side candidates not included in the list D and the previously-transmitted candidate list G in descending order of priority. The server 2 generates a new list B containing these as external candidates and transmits the list B to the terminal device 1.

The terminal device 1 having received the transmission of the above-described list B combines the three internal candidates in the list A and the four external candidates in the list B together and arranges them in descending order of priority so as to generate the final candidate list C. As a result, the list C includes "same" which is an external candidate for the input character string one step before in addition to the four external candidates "sale," "sad," "sandwich," and "santa claus" for the updated input character string "sa."

Figure 7:
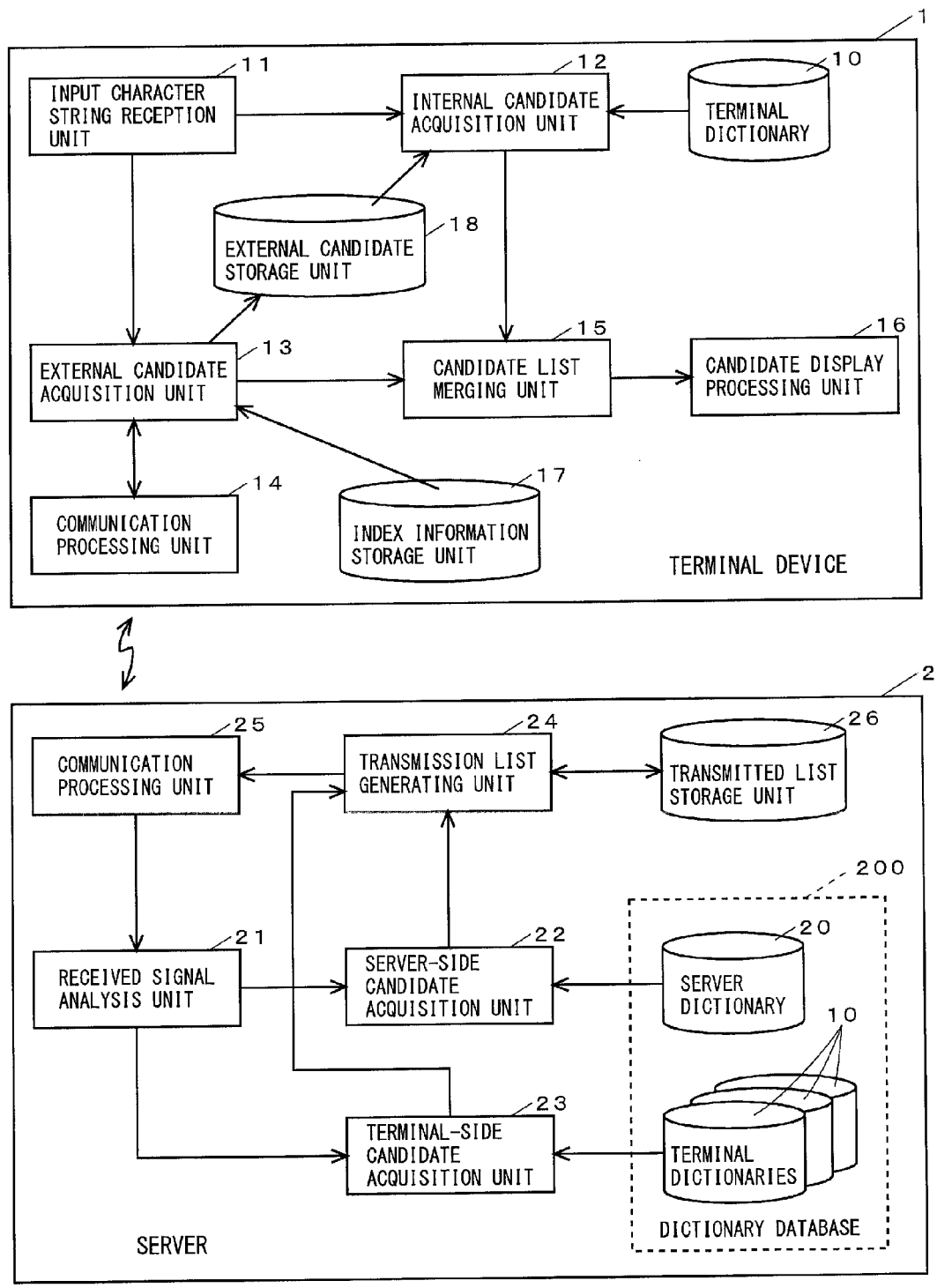
FIG. 7 is a functional block diagram of a terminal device and a server according to one or more embodiments of the present invention.

FIG. 7 is a functional block diagram illustrating configurations of the terminal device 1 and the server 2 illustrated in FIGS. 1 to 6 and relationships between these devices.

The terminal device 1 is provided with functions of an input character string reception unit 11, an internal candidate acquisition unit 12, an external candidate acquisition unit 13, a communication processing unit 14, a candidate list merging unit 15, and a candidate display processing unit 16 by means of dedicated programs.

Moreover, in a memory of the terminal device 1, the terminal dictionary 10 is stored and an external candidate storage unit 18 for retaining the previous external candidate list F illustrated in FIGS. 3 and 6 is provided. Furthermore, an index information storage unit 17 is provided in the memory of the terminal device 1 which performs the Japanese candidate prediction processing shown in FIGS. 1 to 3. The index information storage unit 17 is provided for storing reading character strings of words or phrases registered not in the device's own terminal dictionary 10 but in the server dictionary 20. The external candidate acquisition unit 13 performs a search based on the input character string through the index information storage unit 17 and generates a candidate transmission request signal only when an external candidate can be provided from the server 2. The communication processing unit 14 transmits the candidate transmission request signal to the server 2, receives the external candidate list B returned from the server 2, and gives the list B to the external candidate acquisition unit 13.

The server 2 is provided with functions of a received signal analysis unit 21, a server-side candidate acquisition unit 22, a terminal-side candidate acquisition unit 23, a transmission list generating unit 24, and a communication processing unit 25 by means of dedicated programs. Moreover, a dictionary database 200 including the aforementioned server dictionary 20 and terminal dictionaries 10 for various dictionary IDs is provided and a region for functioning as a transmitted list storage unit 26 for storing the previously-transmitted external candidate list G is set in a memory of the server 2.

Figure 8:
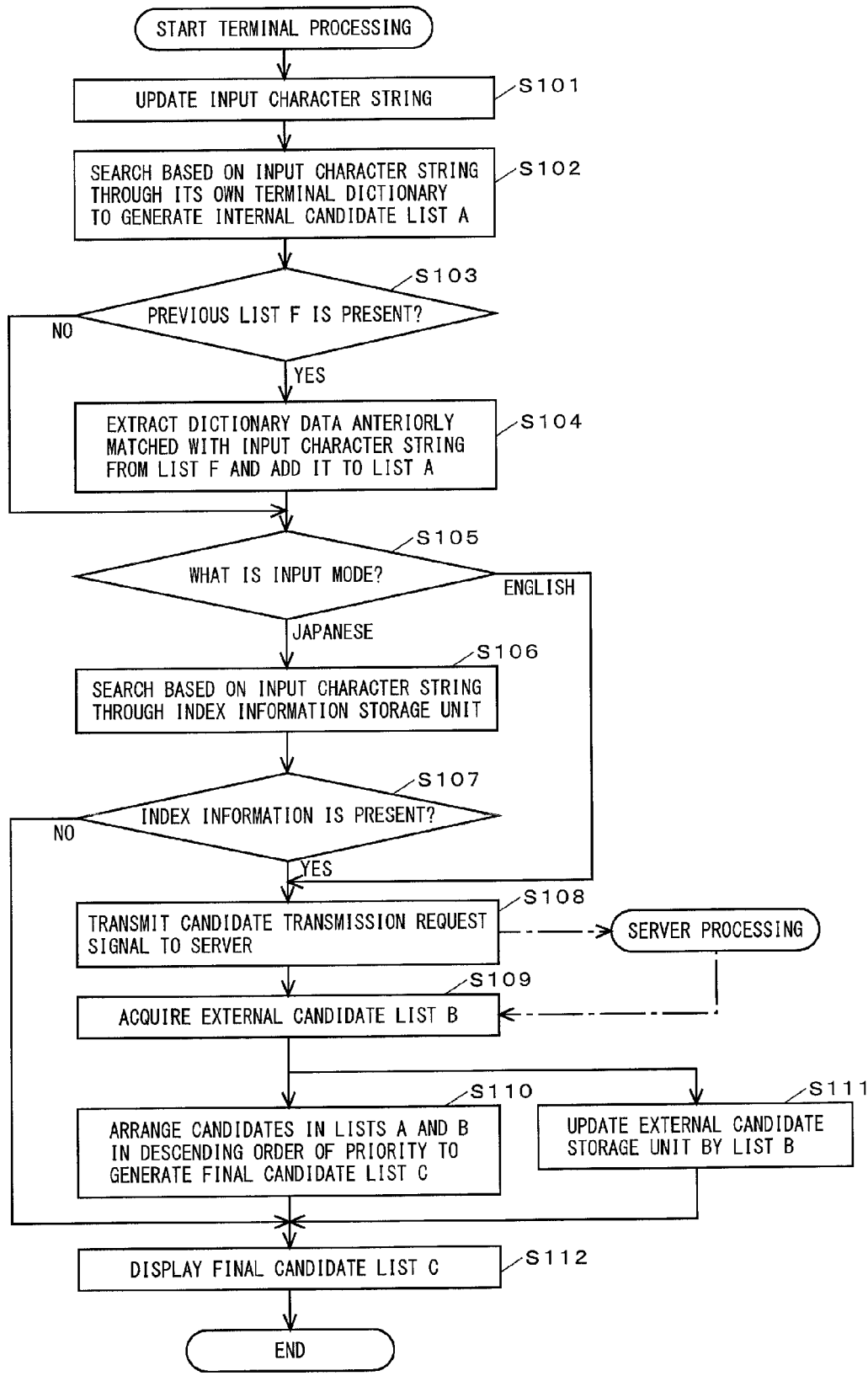
FIG. 8 is a flow chart illustrating a procedure of processing performed by the terminal device in response to update of an input character string according to one or more embodiments of the present invention.
Figure 9:
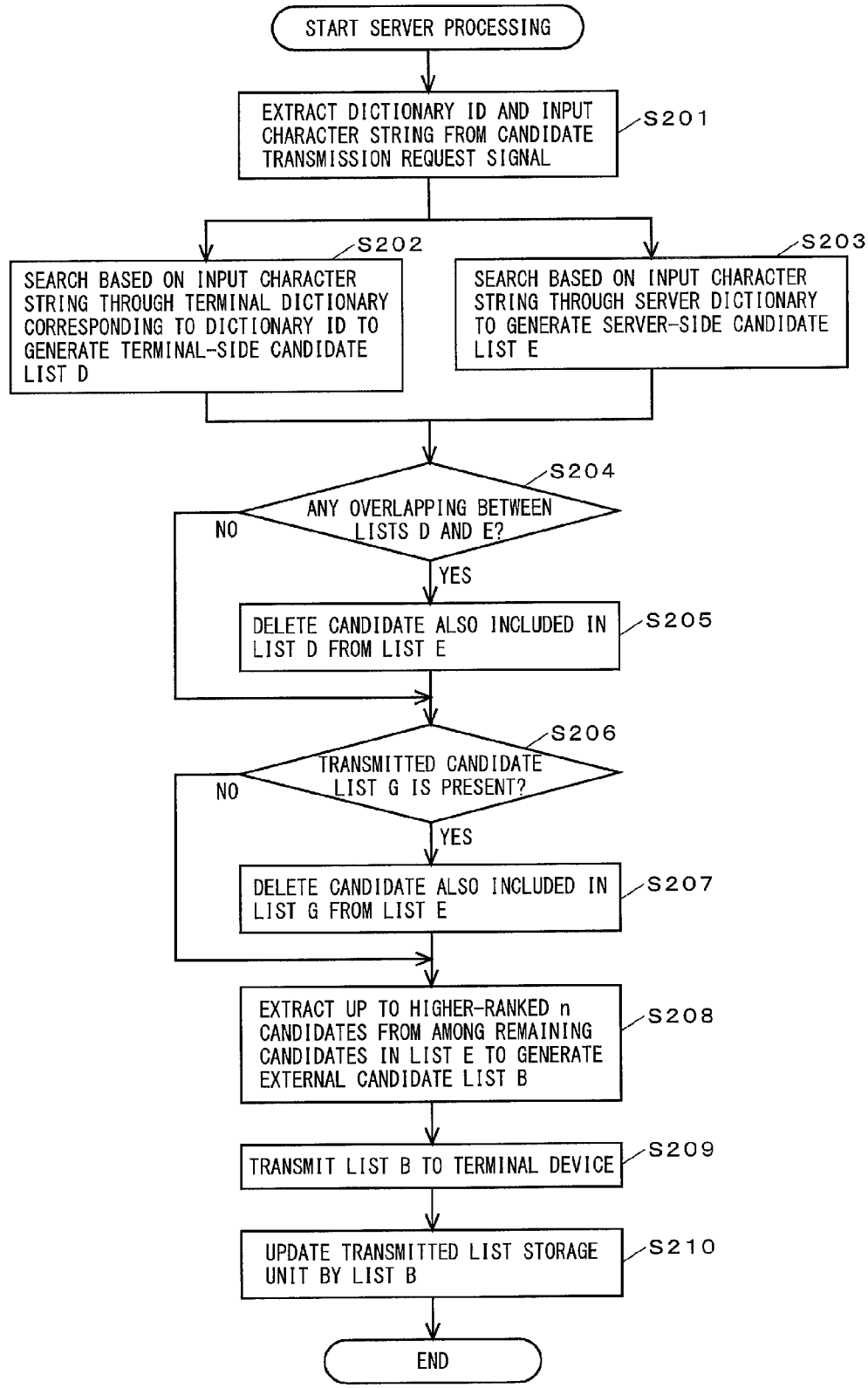
FIG. 9 is a flow chart illustrating a procedure of processing performed by the server in response to the reception of a candidate transmission request signal according to one or more embodiments of the present invention.

FIG. 8 shows a flow of processing performed by the terminal device 1 in response to update of an input character string resulting from an input operation performed by a user. FIG. 9 shows a flow of processing performed by the server 2 having received a candidate transmission request signal from the terminal device 1. Processing performed by the respective functions shown in FIG. 7 will be described below in detail according to the flows of FIGS. 8 and 9.

Firstly, the input character string reception unit 11 updates an input character string according to an input operation performed by a user (step S101) in the processing of the terminal device 1 shown in FIG. 8. Subsequently, the internal candidate acquisition unit 12 performs a search through the terminal dictionary 10, extracts dictionary data anteriorly matched with the input character string, and arranges the extracted dictionary data in descending order of priority so as to generate the internal candidate list A (step S102).

Furthermore, the internal candidate acquisition unit 12 checks the external candidate storage unit 18. Here, if the previous external candidate list F is stored in the external candidate storage unit 18 ("YES" in step S103), the internal candidate acquisition unit 12 extracts dictionary data anteriorly matched with the aforementioned input character string from the list F and adds the extracted dictionary data to the internal candidate list A (step S104). If the external candidate storage unit 18 is empty ("NO" in the step S103), the step S104 is skipped. If the corresponding candidate cannot be extracted from the list F, the addition of such a candidate to the internal candidate list A is skipped at the step S104.

Thereafter, the flow proceeds to processing to be performed by the external candidate acquisition unit 13. Firstly, the external candidate acquisition unit 13 checks an input mode (step S105). When a Japanese input mode is set, the external candidate acquisition unit 13 performs a search based on the input character string through the index information storage unit 17 (step S106). If index information anteriorly matched with the input character string is found by this search ("YES" in step S107), the external candidate acquisition unit 13 generates a candidate transmission request signal including the input character string and the dictionary ID of the device's own terminal dictionary 10 and transmits the candidate transmission request signal to the server 2 in cooperation with the communication processing unit 14 (step S108). When an English input mode is set, on the other hand, the steps S106 and S107 are skipped and the step S108 is always performed.

Referring now to FIG. 9, the processing to be performed by the server 2 having received the aforementioned candidate transmission request signal will be described. In the server 2, once the candidate transmission request signal is received by the communication processing unit 25, the received signal analysis unit 21 extracts the dictionary ID and the input character string from the candidate transmission request signal (step S201).

After the completion of the signal analysis, the terminal-side candidate acquisition unit 23 and the server-side candidate acquisition unit 22 operate concurrently to perform search processing (steps S202 and S203) with the input character string extracted in the step S201. In the step S202, the terminal-side candidate acquisition unit 23 performs a search through the terminal dictionary 10 corresponding to the dictionary ID extracted in the step S201 so as to generate the terminal-side candidate list D. The list D is identical with the internal candidate list A generated in the step S102 by the terminal device 1. In the step S203, the server-side candidate acquisition unit 22 performs a search based on the aforementioned input character string through the server dictionary 20 so as to generate the server-side candidate list E.

Thereafter, the transmission list generating unit 24 checks whether or not the terminal-side candidate list D includes a candidate overlapping with the server-side candidate list E. If included ("YES" in step S204), the overlapping candidate is deleted from the list E (step S205). Furthermore, the transmission list generating unit 24 checks the transmitted list storage unit 26. If this storage unit 26 has the previously-transmitted external candidate list G ("YES" in step S206), a candidate contained in the list G is deleted from the list E (step S207).

Thereafter, the transmission list generating unit 24 extracts up to n candidates in descending order of priority from among the remaining server-side candidates in the list E and generates the list B containing these as external candidates (step S208). This list B is transmitted to the terminal device 1 by the communication processing unit 25 being on standby until the completion of the generation of the list B after the reception of the candidate transmission request signal (step S209). Furthermore, the transmission list generating unit 24 rewrites the information in the transmitted list storage unit 26 so that the transmitted list B of the n external candidates is set as the previous list G (step S210). Such rewriting ends the processing of the server 2 in response to a single candidate transmission request signal.

Referring back to FIG. 8, after the transmission of the candidate transmission request signal in the step S108, the communication processing unit 14 receives the external candidate list B returned by the server-side processing shown in FIG. 9 in a next step S109. The external candidate acquisition unit 13 accepts the received list B. The candidate list merging unit 15 merges the external candidates in the list B and the internal candidates in the list A together and rearranges them in descending order of priority so as to generate the final candidate list C (step S110).

In the meantime, the external candidate acquisition unit 13 rewrites the information in the external candidate storage unit 18 so that the external candidate list B is set as the list F (step S111).

In a final step S112, the candidate display processing unit 16 performs processing for displaying the final candidate list C generated in the step S110 and the processing is ended. If the input character string is updated successively by a character input operation performed by the user, the processing is performed again starting from the step S101 in the same manner as the above-described flow.

Since the steps S108 to S111 are skipped if no index information anteriorly matched with the input character string is registered in the index information storage unit 17, the list C generated in the step S110 contains only the internal candidate list A. The list A may include the previous external candidate added in the step S104 even in such a case.

In the server 2 according to one or more embodiments of the present invention, every time the server 2 transmits a new external candidate list B to the terminal device 1, the list G is updated by the transmitted list B. Also, in the terminal device 1, every time the terminal device 1 acquires a new external candidate list B, the list F is updated by the list B. However, the lists B generated over a certain period of time may be accumulated in either device.

For example, the terminal device 1 may accumulate the lists B acquired over a period extending from the input of the first character of a reading character string to the determination of candidates. Also in the server 2, in response to the reception of the first candidate transmission request signal from a certain terminal device 1, the server 2 may keep a storage area for the lists G for the certain terminal device 1. As long as the server 2 receives a candidate transmission request signal from the same terminal device 1 within a predetermined period of time, the server 2 may accumulate the list B returned in response to each signal. If, even after the elapse of the predetermined period of time since the transmission of the list B, a next candidate transmission request signal is not sent from the terminal device 1 to which the list B has been transmitted, the storage area for that terminal device 1 and the accumulated information may be erased. In this manner, wasteful use of memory resources in the server 2 can be prevented.

In a case where a reading character string is updated over a plurality of times in order to input a single word and the above-described processing shown in FIGS. 8 and 9 is performed for every update will now be discussed. At a stage where the characters in the input character string is few, the server-side candidate list E may contain a considerable number of candidates. However, only a certain number of candidates with high priorities are transmitted to the terminal device 1. When the input character string has a certain amount of length by the addition of input characters, on the other hand, the number of candidates in the server-side candidate list E is reduced. Therefore, it is more likely that even a candidate having a less priority is included in the list B.

Thus, if a user intends to input a word having a high priority but is not registered in the terminal dictionary 10, such as a new word or a jargon, for example, the desired word can be imported into the terminal device 1 as an external candidate and placed at a high rank in the final candidate list C at a stage where the number of character input operations is relatively small. Also, when a user intends to input a word having a low frequency of use and not registered in the terminal dictionary 10, the desired word can be imported into the terminal device 1 as an external candidate and included in the final candidate list C by inputting a certain amount of characters.

In the Japanese input mode, when a special word not registered even in the server dictionary 20 is inputted or when a word belonged to a genre for which a sufficient number of words are registered in the terminal dictionary 10 is inputted, at a stage where an input character string attains a certain amount of length, index information anteriorly matched with the input character string can no longer be extracted from the index information storage unit 17. Thus, the steps S108 to S111 are skipped, i.e., the communication for acquiring external candidates is not performed. Therefore, the processing is prevented from being delayed due to wasteful communication and thus the generation or display of the final candidate list C can be performed efficiently.

Even when, despite that a word to be inputted has been transmitted from the server 2 as an external candidate, contained in the final candidate list C, and displayed, a user overlooked the display and performed a further character input operation, the overlooked word is stored in the external candidate storage unit 18. In the step S104 of the processing flow shown in FIG. 8 performed in response to the addition of one more reading character, the overlooked word is extracted from the external candidate storage unit 18 and added to the internal candidate list A (for example, "コンサルティング (konsarutingu)" and "コンサルティング 会社 (konsarutingu kaisha)") in the example of FIGS. 1 and 3 and "same" in the example of FIGS. 4 and 6). Therefore, the overlooked external candidate can be included again in the final candidate list C. Even if the user overlooks the word again at this stage and one more character is added to the input character string, the lists F and G stored in the external candidate storage unit 18 of the terminal device 1 and the transmitted list storage unit 26 of the server 2, respectively, are updated and the overlooked word is thereby erased. Thus, as a result of the processing of the server 2 in response to the candidate transmission request signal including the updated input character string, the overlooked word can be included again in the external candidate list B, transmitted, and included also in the final candidate list C.

For example, "コンサルティング (konsarutingu)" and "コンサルティング 会社 (konsarutingu kaisha)" transmitted to the terminal device 1 as external candidates for the input character string "こん (kon)" in the example of FIG. 1 are stored in the list F also when the input character string is updated to "こんさ (konsa)" and included also in the final candidate list C as shown in FIG. 3. In response to the generation of the list C, however, the list F is updated to the contents corresponding to the list B in FIG. 3. Thus, "コンサルティング (konsarutingu)" and "コンサルティング会社 (konsarutingu kaisha)" are deleted from the list F. Therefore, if one more input character is added and the input character string is thereby updated to "こんさる (konsaru)," for example, the terminal device 1 cannot acquire "コンサルティング (konsarutingu)" and "コンサルティング 会社 (konsarutingu kaisha)" anteriorly matched with "こんさる (konsaru)" by itself. However, these candidates are transmitted again from the server 2 as external candidates for the candidate transmission request signal including the input character string "こんさる (konsaru)."

In this manner, once a word is transmitted as an external candidate, the word is maintained as a final form of candidate as long as the word is matched with the updated input character string even if the word is not selected by a user in the course of updating the input character string. Therefore, according to one or more embodiments of the present invention, even a word not registered in the terminal dictionary 10 can be displayed as a candidate as with registered words as long as a state matched with the input character string continues.

Another example of one or more embodiments of the present invention is now described. Although the priority of a word or phrase common to the dictionaries 10 and 20 has the same value in any of the dictionaries in the specific examples shown in FIGS. 1 to 6, the priority may be varied among the dictionaries. Also in such a case, if the terminal device 1 updates priorities in the terminal dictionary 10 according to usages or the like and the display of candidates based on the updated priorities is given a priority, only the words or phrases not registered in the terminal device 1 may be provided from the server 2 as external candidates with the same method as described in the example above. If it is desired to revise priorities in the server dictionary 20 when appropriate based on changes in the usages of various words or phrases, or the like, and to reflect such revision in the display of candidates in the terminal device 1, on the other hand, the same candidates extracted from both of the terminal dictionary 10 and the server dictionary 20 but having different priorities may be included in the external candidate list B, transmitted from the server 2 to the terminal device 1, and included in the final candidate list C in the terminal device 1 by giving a priority to the external candidate.

Also when priorities are adjusted in the server 2 and the thus adjusted priorities are reflected also in the terminal device 1, it is desirable that not only a word or phrase not registered in the terminal dictionary 10 but also a word or phrase registered in the terminal dictionary 10 but having a priority different from that in the terminal dictionary 10 be included in the external candidate list B. By doing so, about the candidates overlapped between the lists A and B, the candidate having a higher priority can be selected in the terminal device 1.

Regarding the Japanese or English input prediction processing, a case where an arranged order of candidates in the terminal device 1 is varied by adjusting a priority in the server 2 is described below.

FIG. 10 shows a configuration example of dictionary data for part of the Japanese server dictionary 20, more specifically, dictionary data for expressions with the first character of its reading character string being "お (o)." The dictionary data according to one or more embodiments of the present invention includes a priority based on a typical frequency of use in addition to the written character string and reading character string (not shown) thereof. Dictionary data in the various terminal dictionaries 10 (not shown) similarly include typical priorities. The values of the priorities are the same among the dictionaries.

Furthermore, in the server dictionary 20, dictionary data of an expression whose probable input time is specified includes attribute data representing the probable input time. More specifically, "Morning" attribute data is set in "おはよう(ohayou)," "おはようございます (ohayoogozaimasu)," and "おはよー (owayoo)" each having a higher input frequency in the morning and "Evening" and "Night" attribute data are set in "おつかれさま (otsukaresama)," "おかえり (okaeri)," "おつ かれさまです (otsukaresamadesu)," and "おつかれ (otsukare)" each having a higher input frequency in the evening or at night in the example of FIG. 10. No attribute data is set for "おげんき (ogenki)" and "おそく(osoku)" as the probable input time cannot be easily specified.

Figure 11:
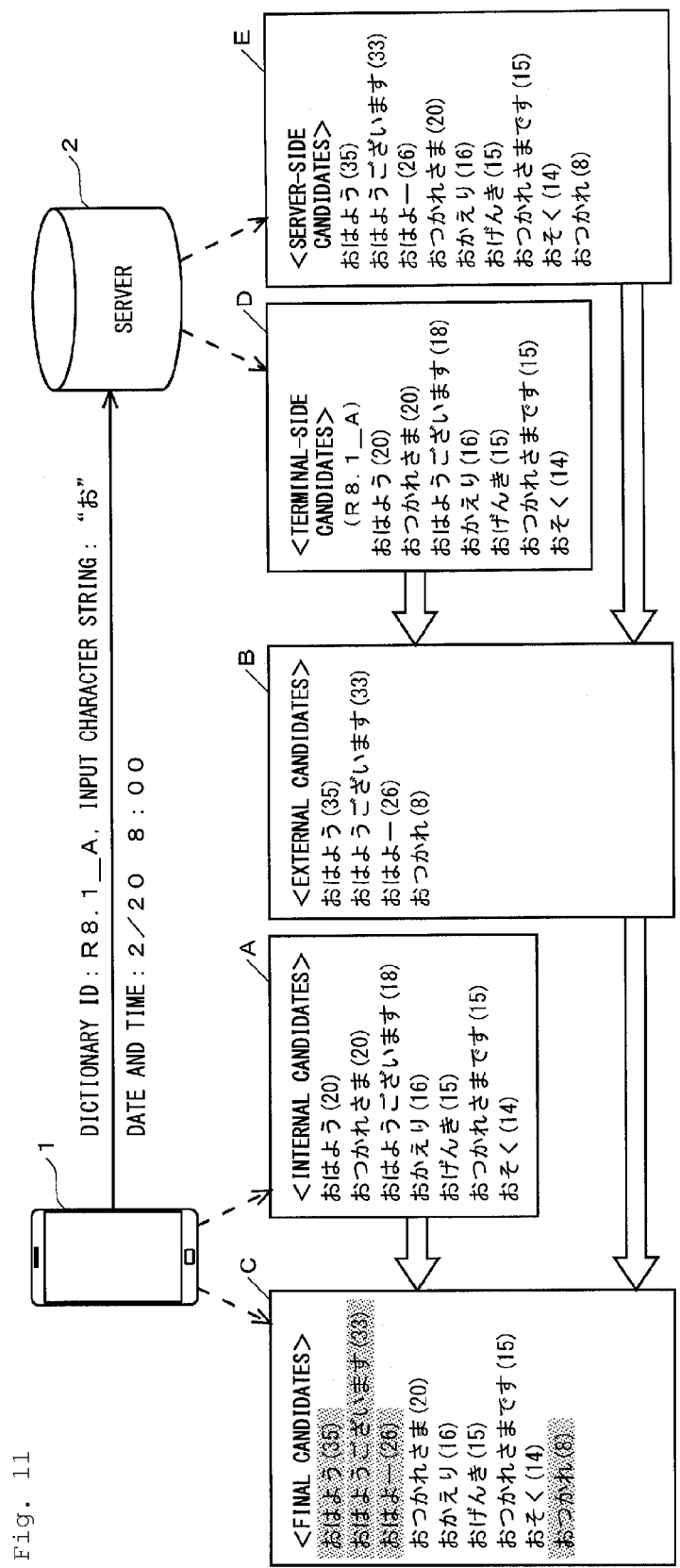
FIG. 11 is an explanatory diagram illustrating the outline of Japanese input prediction processing that enables a candidate associated with attribute data matched with the time of a character input to be placed at a high rank in a candidate list according to one or more embodiments of the present invention.
Figure 12:
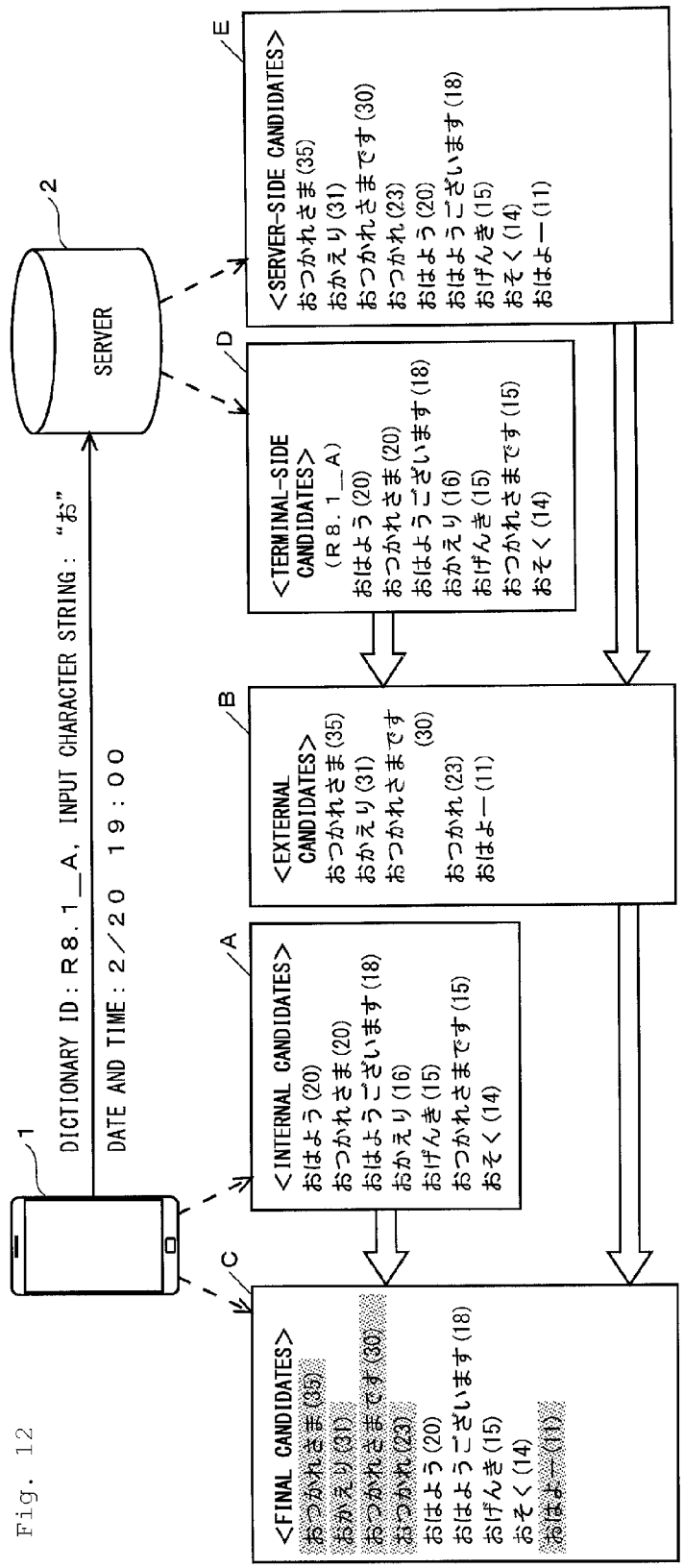
FIG. 12 is an explanatory diagram illustrating the outline of Japanese input prediction processing that enables a candidate associated with attribute data matched with the time of a character input to be placed at a high rank in a candidate list according to one or more embodiments of the present invention.

FIGS. 11 and 12 show a principle of processing for varying a candidate display order in the final candidate list C according to the time of a character input taking, as an example, a case where the expressions shown in FIG. 10 are extracted as candidates in response to the input of a kana character "お (o)" to the terminal device 1. There are no stored previous external candidate lists F and G in this example since this is a stage where the first character of the input character string has just been input.

The terminal dictionary 10 of "R8.1_A" same as that in the examples of FIGS. 1 and 3 is installed in the terminal device 1. Seven expressions out of the nine expressions shown in FIG. 10, excluding "おはよー (owayoo)" with a priority of 11 and "おつかれ (otsukare)" with a priority of 8, are registered in the terminal dictionary 10 such that each has the same priority value as the set value in the server dictionary 20. Therefore, in the terminal device 1 in any of the examples of FIGS. 11 and 12, the internal candidate list A containing the aforementioned seven expressions is generated in response to the input of the kana character "お (o)."

Furthermore, although external candidates are acquired by transmitting a candidate transmission request signal to the server 2 from the terminal device 1, the candidate transmission request signal includes date and time data when the input character string is accepted in addition to the dictionary ID and the input character string.

The server 2 having received the aforementioned candidate transmission request signal performs a search through both of the terminal dictionary 10 corresponding to the dictionary ID and the server dictionary 20 to generate the terminal-side candidate list D and the server-side candidate list E, respectively, as with the example of FIGS. 1 and 3. The list D is same as the list A generated in the terminal device 1. The list E contains nine expressions including "おはよー (owayoo)" and "おつかれ (otsukare)" not included in the lists A and D.

Furthermore, among the server-side candidates contained in the list E, the server 2 according to one or more embodiments of the present invention adds a predetermined adjustment value (+15 in this example) to the priority of a candidate with which attribute data matched with the date and time data in the candidate transmission request signal from the terminal device 1 is associated. Moreover, in the processing of generating the external candidate list B by means of cross-checking between the server-side candidate list E and the terminal-side candidate list D, the server 2 selects up to n server-side candidates (n=5 in this example) in descending order of priority from among not only server-side candidates not included in the list D but also server-side candidates included in the list D but having priorities different from those in the list D.

In the example of FIG. 11, the time indicated by the date and time data in the candidate transmission request signal is 8:00 am. Therefore, among the server-side candidates extracted from the server dictionary 20, the server 2 adds 15 points to each of the priorities of "おはよう (ohayou)," "おはようございます (ohayougozaimasu)," and "おはよー (owayoo)" in which the "Morning" attribute data is set. As a result, the external candidate list B to be transmitted to the terminal device 1 includes "おはよう (ohayou)" and "おはようございます (ohayougozaimasu)" each having a priority higher than that in the terminal-side candidate list D in addition to "おはよー (owayoo)" and "おつかれ (otsukare)" not included in the list D.

The terminal device 1 having received the transmission of the aforementioned list B generates the final candidate list C by adopting external candidates in the list B not included in the list A and selecting higher priority external candidates about "おはよう (ohayoo)" and "おはようございます (ohayougozaimasu)" overlapped between the internal candidate list A generated by the terminal device 1 itself and the list B. As a result, "おはよう (ohayou)," "おはようございます (ohayougozaimasu)," and "おはよー (owayoo)" originating from the external candidates corresponding to the "Morning" attribute data occupy the top three in the list C. On the other hand, no adjustment is made on the priority of the remaining external candidate "おつかれ (otsukare)" and the priority is therefore kept at a typical low value. Thus, "おつかれ (otsukare)" ranks at the bottom in the list C.

In the example of FIG. 12, the time indicated by the date and time data in the candidate transmission request signal is 7:00 pm. Therefore, among the server-side candidates extracted from the server dictionary 20, the server 2 adds 15 points to each of the priorities of "おつかれさま (otsukaresama)," "おはよう (okaeri)," "おつ かれさまです (otsukaresamadesu)," and "おつかれ (otsukare)" in which the "Night" attribute data is set. As a result, the external candidate list B to be transmitted to the terminal device 1 includes "おつかれさま (otsukaresama)," "おかえり (okaeri)," and "おつかれさまです (otsukaresamadesu)" each having a priority higher than that in the list D in addition to "おはよー (owayoo)" and "おつかれ (otsukare)" not included in the terminal-side candidate list D.

The terminal device 1 having received the transmission of the aforementioned list B generates the final candidate list C by adopting external candidates in the list B not included in the list A and selecting higher priority external candidates about "おつかれさま (otsukaresama)," "おかえり (okaeri)," and "おかえり (otsukaresamadesu)" overlapped between the internal candidate list A generated by the terminal device 1 itself and the list B. As a result, these three candidates occupy the top three in the list C. The external candidate "おつかれ (otsukare)" whose priority has been similarly raised in response to the "Night" attribute data ranks in the fourth place. On the other hand, no adjustment is made on the priority of the remaining external candidate "おはよー (owayoo)" and the priority is therefore kept at a typical low value. Thus, "おはよー (owayoo)" ranks at the bottom in the list C.

Figure 13:
FIG. 13 is an explanatory diagram illustrating an example of dictionary data for an English server dictionary including attribute data representing time when an input frequency is increased according to one or more embodiments of the present invention.

FIG. 13 shows a configuration example of dictionary data for part of the English server dictionary 20, more specifically, dictionary data for expressions with the first character thereof being "H." The dictionary data comprises a written character string and a priority based on a typical frequency of use. Furthermore, "Morning" and "Afternoon" attribute data are set in "How are you?," "Have a nice day," and "How's it going?" each having a higher input frequency in the morning and in the afternoon. "Night" attribute data is set in "Have a nice dream." and "Have a good sleep." each having a higher input frequency at night.

Figure 14:
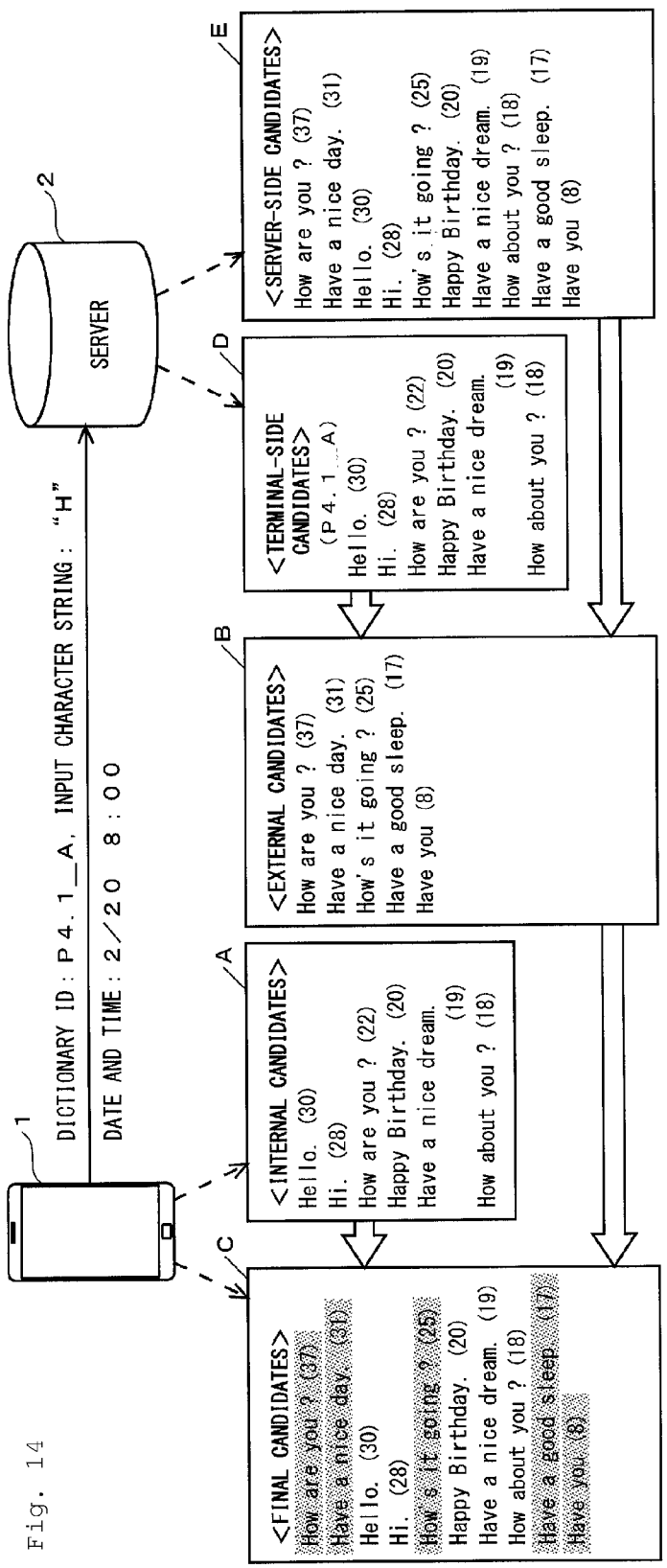
FIG. 14 is an explanatory diagram illustrating the outline of English input prediction processing that enables a candidate associated with attribute data matched with the time of a character input to be placed at a high rank in a candidate list according to one or more embodiments of the present invention.
Figure 15:
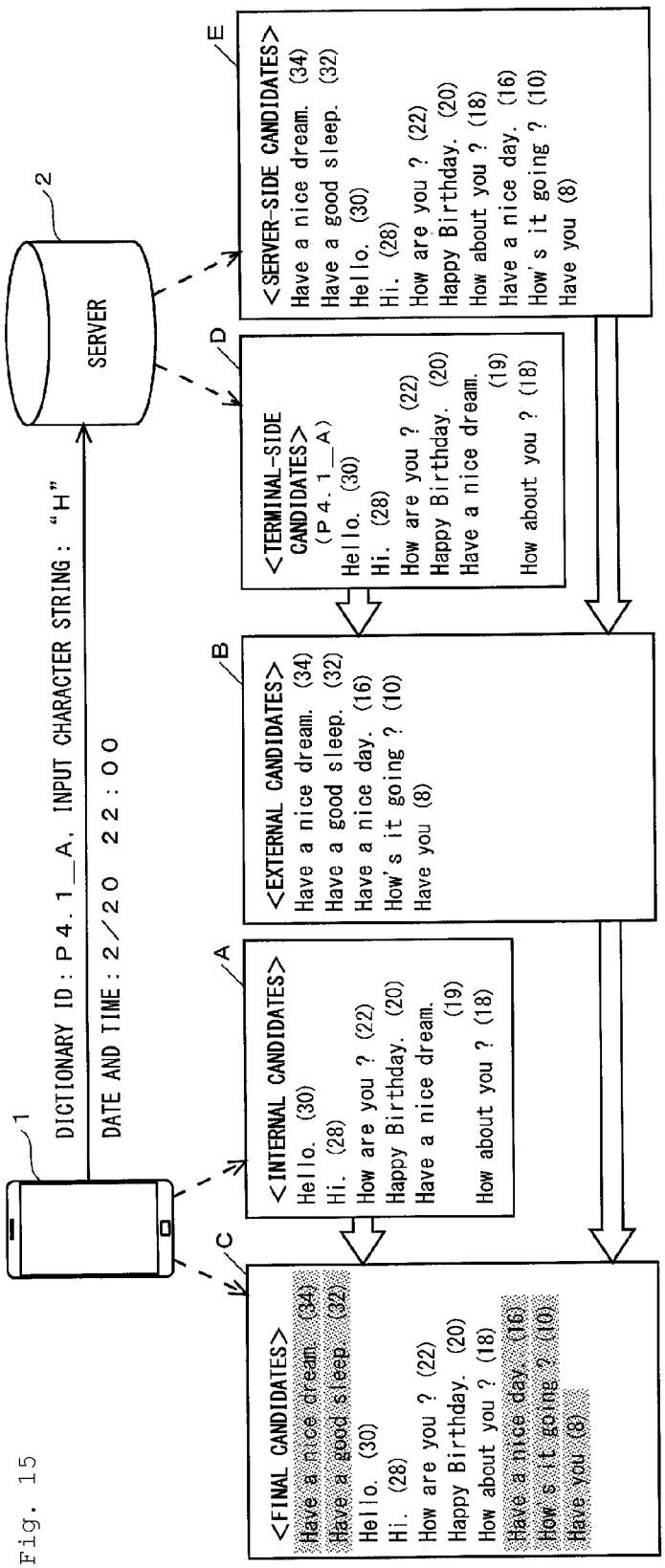
FIG. 15 is an explanatory diagram illustrating the outline of English input prediction processing that enables a candidate associated with attribute data matched with the time of a character input to be placed at a high rank in a candidate list according to one or more embodiments of the present invention.

FIGS. 14 and 15 show a principle of processing for varying a candidate display order in the final candidate list C according to the time of a character input taking, as an example, a case where the expressions shown in FIG. 13 are extracted as candidates in response to the input of "H" to the terminal device 1.

The terminal dictionary 10 of "P4.1_A" same as that in the examples of FIGS. 4 and 6 is installed in the terminal device 1. Six expressions each having a priority of 18 or greater, i.e., "Hello.," "Hi.," "How are you?," "Happy Birthday.," "Have a nice dream.," and "How about you?" out of the ten pieces of dictionary data shown in FIG. 13 are registered in the terminal dictionary 10 such that each has the same priority value as the set value in the server dictionary 20. Therefore, in any of the examples of FIGS. 14 and 15, the internal candidate list A containing the aforementioned six expressions is generated in the terminal device 1 in response to the input of "H."

As with the examples described in reference to FIGS. 11 and 12, a candidate transmission request signal from the terminal device 1 comprises a dictionary ID, an input character string, and date and time data of when the input character string is accepted. The server 2 having received the candidate transmission request signal performs a search through both of the terminal dictionary 10 corresponding to the dictionary ID and the server dictionary 20 to generate the terminal-side candidate list D and the server-side candidate list E, respectively. The list D is same as the list A generated in the terminal device 1. The list E contains ten expressions including "Have a good sleep.," "Have a nice day.," "How's it going?," and "Have you" not included in the lists A and D.

The server 2 adjusts the priority of a server-side candidate included in the list E in the same manner as that in the examples of FIGS. 11 and 12. The server 2 selects up to n server-side candidates (n=5 in this example) in descending order of priority from among not only server-side candidates not included in the list D but also server-side candidates included in the list D but having priorities higher than those in the list D.

In the example of FIG. 14, the time indicated by the date and time data in the candidate transmission request signal is 8:00 am. Therefore, among the server-side candidates in the list E, the server 2 adds 15 points to each of the priorities of "How are you?," "Have a nice day.," and "How's it going?" in which the "Morning" attribute data is set. Moreover, the server 2 extracts, from the list E, "How are you?" included in the list D but having a priority higher than that in the list D in addition to "Have a good sleep.," "Have a nice day.," "How's it going?," and "Have you" not included in the list D so as to generate the external candidate list B. The server 2 then transmits the list B to the terminal device 1.

The terminal device 1 having received the transmission of the aforementioned list B generates the final candidate list C by adopting the four external candidates not included in the internal candidate list A and selecting the higher priority external candidate about "How are you?" overlapped between the list A and the list B. In this list C, "How are you?" ranks in the first place. Furthermore, the external candidates "Have a nice day." and "How's it going?" in which the "Morning" attribute data is similarly set and thus the priorities thereof are raised rank in the second and fifth places, respectively.

In the example of FIG. 15, the time indicated by the date and time data in the candidate transmission request signal is 10:00 pm. Therefore, among the server-side candidates in the list E, the server 2 adds 15 points to each of the priorities of "Have a nice dream." and "Have a good sleep." in which the "Night" attribute data is set. Moreover, the server 2 extracts, from the list E, "Have a good sleep.," "Have a nice day.," "How's it going?," and "Have you" not included in the list D and "Have a nice dream." included in the list D but having a priority higher than that in the list D so as to generate the external candidate list B. The server 2 then transmits the list B to the terminal device 1.

The terminal device 1 having received the transmission of the aforementioned list B generates the final candidate list C by adopting the four external candidates not included in the internal candidate list A and selecting the higher priority external candidate about "Have a nice dream." overlapped between the list A and the list B. In this list C, "Have a nice dream." ranks in the first place. The external candidate "Have a good sleep." in which the "Night" attribute data is similarly set and thus the priority thereof has been raised ranks in the second place.

In any of the examples of FIGS. 11, 12, 14, and 15, the priority adjustment in the server 2 is performed temporarily in response to the candidate transmission request signal from the terminal device 1. The priorities in the server dictionary 20 are kept at the original set values. Therefore, irrespective of the timing at which the candidate transmission request signal from the terminal device 1 is received, only the priority of a server-side candidate having attribute data matched with the date and time data in the signal is raised, thereby increasing the possibility of the raised server-side candidate being included in the external candidate list B. Thus, candidates displayed at high ranks in the final candidate list C can be varied according to the time when a character input is performed in the terminal device 1, thereby improving convenience.

Other than the above-described examples, data representing seasons such as "Spring," "Summer," "Fall," and "Winter" may be set as the attribute data representing input time. Moreover, the priority adjustment value may not be limited to a fixed value. An adjustment value may be varied according to the value of a typical priority. Moreover, although the candidate transmission request signal from the terminal device 1 includes the date and time data in the examples of FIGS. 11, 12, 14, and 15, the candidate transmission request signal may include attribute data ("Morning," "Night," or the like) corresponding to the current time instead.

Examples of one or more embodiments of the present invention have been described with respect to the candidate prediction processing for extracting words or expressions anteriorly matched with an input character string in the mobile terminal device 1. However, the present invention is not limited to such candidate prediction processing. Regarding Japanese character type conversion processing for extracting words or phrases having a reading character string completely matched with an inputted kana character string, external candidates can also be acquired from the server with a method similar to the above-described method and a candidate list combining internal candidates extracted in the terminal device 1 and the external candidates can be generated. Moreover, the terminal device 1 is not limited to a mobile device. Similar processing can be performed also in a server-client system employing a personal computer as a terminal device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An information processing system comprising:
a terminal device configured to display a candidate list of a word or a phrase that corresponds to an input character string set, according to a character input operation, and determine, according to an operation of selecting one candidate from a displayed candidate list, a selected candidate as a character string to be inputted; and
a server that transmits a candidate capable of being included in the candidate list to the terminal device in response to a request from the terminal device,
wherein the terminal device comprises:
a dictionary storage unit that stores a terminal dictionary that registers a plurality of dictionary data pieces, each dictionary data piece having a configuration associating a written character string representing a word or phrase with a priority;
an internal candidate acquisition unit that acquires dictionary data comprising a candidate selected by searching based on the input character string through the terminal dictionary in the dictionary storage unit;
an external candidate acquisition unit that transmits a candidate transmission request signal comprising identification information of the terminal dictionary in the dictionary storage unit and the input character string to the server and acquires dictionary data comprising a candidate returned from the server in response to the transmission of the candidate transmission request signal; and
a list generating unit that generates the candidate list by arranging written character strings of the dictionary data acquired by the internal candidate acquisition unit and the external candidate acquisition unit according to priorities of the list generating unit, and
wherein the server comprises:
a dictionary storage unit that stores a plurality of terminal dictionaries and a server dictionary that registers more pieces of dictionary data than each of the plurality of terminal dictionaries does;
a candidate transmission request reception unit that accepts the candidate transmission request signal from the terminal device;
a search unit that conducts a search based on the input character string included in the candidate transmission request signal through the terminal dictionary corresponding to the identification information in the candidate transmission request signal and through the server dictionary; and
a candidate returning unit that returns a dictionary data extracted by the search through the server dictionary and different from dictionary data extracted by the search through the terminal dictionary to the terminal device having transmitted the candidate transmission request signal.

2. The information processing system according to claim 1, wherein:
the server further comprises a transmitted data storage unit that temporarily retains the dictionary data returned to the terminal device in response to the candidate transmission request signal from the terminal device,
the candidate returning unit of the server returns a predetermined number of dictionary data pieces not retained in the transmitted data storage unit, selected in descending order of priority from among the dictionary data extracted by the search performed by the search unit through the server dictionary and different from the dictionary data extracted by the search through the terminal dictionary, to the terminal device having transmitted the candidate transmission request signal,
the terminal device comprises a received data storage unit that temporarily retains the dictionary data returned from the server in response to the candidate transmission request signal, and
the internal candidate acquisition unit performs a search based on the input character string on the dictionary data retained in the received data storage unit and on the terminal dictionary in the dictionary storage unit of the device.

3. The information processing system according to claim 1, wherein:
the candidate returning unit of the server adds, from among the dictionary data extracted from the server dictionary by the search performed by the search unit in response to the candidate transmission request signal, dictionary data having the same written character string as the dictionary data extracted by the search through the terminal dictionary but having a different priority to a return subject to the terminal device, and
when both of the external candidate acquisition unit and the internal candidate acquisition unit have acquired dictionary data about the same written character string, the list generating unit adopts the dictionary data acquired by the external candidate acquisition unit to generate the candidate list.

4. The information processing system according to claim 1, wherein:
dictionary data of a word or a phrase whose proper input time can be specified in the server dictionary of the server comprises attribute data representing time,
the external candidate acquisition unit transmits, to the server, the candidate transmission request signal with information representing time when input of the input character string in the signal is accepted is included in the external candidate acquisition unit,
the candidate returning unit of the server adds a predetermined positive adjustment value to a priority of dictionary data comprising attribute data matched with the information representing the time in the candidate transmission request signal among the dictionary data extracted from the server dictionary in response to the candidate transmission request signal and adds dictionary data having a higher priority than the dictionary data extracted by the search through the terminal dictionary for the input character string in the candidate transmission request signal to a return subject to the terminal device, and, when both of the external candidate acquisition unit and the internal candidate acquisition unit have acquired dictionary data about the same written character string, the list generating unit adopts the dictionary data having the higher priority to generate the candidate list.

5. The information processing system according to claim 1, wherein:

the dictionary data in the terminal dictionary and the server dictionary each include a pre-conversion character string representing a pronunciation of a written character string according to a predetermined character type, and, in response to reception of an operation of inputting a character having the same character type as the pre-conversion character string, the terminal device sets an input character string according to the character type and performs processing of the internal candidate acquisition unit and the external candidate acquisition unit.

6. The information processing system according to claim 5, wherein:

the terminal device comprises an index information storage unit that registers a pre-conversion character string in dictionary data registered that is not in the terminal dictionary of the device but that is in the server dictionary, and the external candidate acquisition unit performs a search based on the input character string set by the operation of inputting a character representing reading of a written character string through the index information storage unit, and transmits the candidate transmission request signal only when the pre-conversion character string corresponding to the input character string is found.

7. An information processing server for transmitting a candidate capable of being included in a candidate list of a word or a phrase corresponding to an input character string set according to a character input operation to a terminal device in response to a request from the terminal device, the terminal device having a function of displaying the candidate list and determining, according to an operation of selecting one candidate from a displayed candidate list, a selected candidate as a character string to be inputted, the information processing server comprising:

a dictionary storage unit that stores a plurality of terminal dictionaries, each terminal dictionary registers a plurality of dictionary data pieces and each dictionary data piece having a configuration associating a written character string representing a word or a phrase with a priority, and a server dictionary that registers more pieces of dictionary data than each of the plurality of terminal dictionaries does, a candidate transmission request reception unit that accepts, from a terminal device storing one of the plurality of terminal dictionaries, a candidate transmission request signal comprising identification information of the terminal dictionary stored in the terminal device and an input character string set according to a character input operation in the terminal device;

a search unit that performs a search based on the input character string included in the candidate transmission request signal through the terminal dictionary corresponding to the identification information in the candidate transmission request signal and through the server dictionary; and a candidate returning unit that returns a dictionary data extracted by the search through the server dictionary and different from dictionary data extracted by the search through the terminal dictionary to the terminal device having transmitted the candidate transmission request signal.

8. A terminal device configured to display a candidate list of a word or a phrase corresponding to an input character string set according to a character input operation and determine, according to an operation of selecting one candidate from a displayed candidate list, a selected candidate as a character string to be inputted, the terminal device comprising:

a dictionary storage unit that stores one of a plurality of terminal dictionaries, each terminal dictionary registers a plurality of dictionary data pieces and each dictionary data piece having a configuration associating a written character string representing a word or phrase with a priority and stored in an external server;

an internal candidate acquisition unit that acquires dictionary data including a candidate selected by searching an input character string set according to a character input operation through the terminal dictionary stored in the dictionary storage unit;

an external candidate acquisition unit that transmits a candidate transmission request signal comprising identification information of the terminal dictionary in the dictionary storage unit and the input character string to the server and acquires, from the server, dictionary data different from the dictionary data acquired by the internal candidate acquisition unit by a return from the server in response to the transmission; and a list generating unit that generates the candidate list by arranging written character strings of the dictionary data acquired by the internal candidate acquisition unit and the external candidate acquisition unit according to priorities of the list generating unit.

9. A non-transitory computer-readable recording medium having recorded thereon a program introduced into a sewer computer storing: a plurality of terminal dictionaries, each terminal dictionary registers a plurality of dictionary data pieces and each dictionary data piece having a configuration associating a written character string representing a word or phrase with a priority; and a server dictionary registering more pieces of dictionary data than each of the plurality of terminal dictionaries does, causing the computer to operate as an information processing server comprising:

a candidate transmission request reception unit that accepts, from a terminal device storing one of the plurality of terminal dictionaries, a candidate transmission request signal comprising identification information of the terminal dictionary stored in the terminal device and an input character string set according to a character input operation in the terminal device;

a search unit that performs a search based on the input character string included in the candidate transmission request signal through the terminal dictionary corresponding to the identification information in the candidate transmission request signal and through the server dictionary; and a candidate returning unit that returns dictionary data extracted by the search through the server dictionary and different from dictionary data extracted by the search through the terminal dictionary to the terminal device having transmitted the candidate transmission request signal.

10. A non-transitory computer-readable recording medium having stored thereon a program introduced into a computer of a terminal device storing one of a plurality of terminal dictionaries, each terminal dictionary registers a plurality of dictionary data pieces and each dictionary data piece having a configuration associating a written character string representing a word or a phrase with a priority and are stored in an external server, causing the computer to operate as a character input device comprising:
    an internal candidate acquisition unit that acquires dictionary data including a candidate selected by searching an input character string set according to a character input operation through the terminal dictionary stored in the terminal device;
    an external candidate acquisition unit that transmits a candidate transmission request signal comprising identification information of the terminal dictionary registered in the terminal device and the input character string to the server and acquires, from the server, dictionary data different from the dictionary data acquired by the internal candidate acquisition unit by a return from the server in response to the transmission; and
    a list generating unit that generates a candidate list by arranging written character strings of the candidates for the dictionary data acquired by the internal candidate acquisition unit and the external candidate acquisition unit according to priorities of the list generating unit.

11. An information processing method performed in a system comprising: a terminal device configured to display a candidate list of a word or a phrase for an input character string set according to a character input operation and determine, according to an operation of selecting one candidate from a displayed candidate list, a selected candidate as an input subject; and a server that transmits a candidate capable of being included in the candidate list to the terminal device in response to a request from the terminal device, comprising:
    acquiring, by the terminal device that stores one of a plurality of terminal dictionaries, each terminal dictionary registers a plurality of dictionary data pieces and each dictionary data piece having a configuration associating a written character string representing a word or phrase with a priority, dictionary data including a candidate selected by searching the input character string through the terminal dictionary stored in the terminal device in response to reception of the character input operation and transmitting a candidate transmission request signal comprising identification information of the terminal dictionary stored in the terminal device and the input character string to the server; receiving candidate dictionary data returned from the server in response to the transmission of the candidate transmission request signal; generating the candidate list by arranging a candidate for the dictionary data acquired by the search through the terminal dictionary and a candidate for the dictionary data received from the server according to priorities of the generating; and,
    when the candidate transmission request signal from the terminal device is received, performing, by the server that stores the plurality of terminal dictionaries and a server dictionary that registers more pieces of dictionary data than each of the plurality of terminal dictionaries does, a search based on the input character string included in the signal through the terminal dictionary corresponding to the identification information in the signal and the server dictionary; and returning dictionary data extracted by the search through the server dictionary and different from dictionary data extracted by the search through the terminal dictionary to the terminal device having transmitted the candidate transmission request signal.

\* \* \* \* \*